United States Patent
Mukherjee et al.

(10) Patent No.: US 10,681,374 B2
(45) Date of Patent: Jun. 9, 2020

(54) DIVERSIFIED MOTION USING MULTIPLE GLOBAL MOTION MODELS

(71) Applicant: GOOGLE LLC, Mountain View, CA (US)

(72) Inventors: Debargha Mukherjee, Cupertino, CA (US); Emil Keyder, Brooklyn, NY (US); Michele Covell, Woodside, CA (US); Chen Wang, Jersey City, NJ (US); Sarah Parker, San Francisco, CA (US); Ramin Zabih, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/016,857

(22) Filed: Jun. 25, 2018

(65) Prior Publication Data
US 2019/0149841 A1    May 16, 2019

Related U.S. Application Data

(60) Provisional application No. 62/587,025, filed on Nov. 16, 2017.

(51) Int. Cl.
*H04N 19/527* (2014.01)
*G06T 7/246* (2017.01)
(Continued)

(52) U.S. Cl.
CPC ........... *H04N 19/527* (2014.11); *G06T 7/251* (2017.01); *H04N 19/109* (2014.11);
(Continued)

(58) Field of Classification Search
CPC .. H04N 19/527; H04N 19/119; H04N 19/573; H04N 19/543; H04N 19/167;
(Continued)

(56) References Cited

U.S. PATENT DOCUMENTS

| 6,008,852 A | 12/1999 | Nakaya |
| 9,438,910 B1 | 9/2016 | Han et al. |

(Continued)

FOREIGN PATENT DOCUMENTS

| EP | 1351510 A1 | 10/2003 |
| EP | 2683165 A1 | 1/2014 |

OTHER PUBLICATIONS

Bankoski, et al., "Technical Overview of VP8, An Open Source Video Codec for the Web", Jul. 11, 2011, 6 pp.
(Continued)

*Primary Examiner* — Dramos Kalapodas
(74) *Attorney, Agent, or Firm* — Young Basile Hanlon & MacFarlane, P.C.

(57) ABSTRACT

A method for encoding a current frame of a video includes jointly determining respective motion models for reference frames and encoding the current frame using the respective motion models. The reference frames are used for encoding the current frame. Jointly determining respective motion models for reference frames includes determining respective aggregated residuals for combinations of candidate motion models and selecting the combination of candidate motion models that corresponds to the smallest aggregated residual. The respective motion models correspond to the candidate motion models of the selected combination.

17 Claims, 17 Drawing Sheets

(51) Int. Cl.
*H04N 19/172* (2014.01)
*H04N 19/44* (2014.01)
*H04N 19/159* (2014.01)
*H04N 19/124* (2014.01)
*H04N 19/176* (2014.01)
*H04N 19/119* (2014.01)
*H04N 19/192* (2014.01)
*H04N 19/109* (2014.01)
*H04N 19/137* (2014.01)
*H04N 19/17* (2014.01)
*H04N 19/167* (2014.01)
*H04N 19/543* (2014.01)
*H04N 19/573* (2014.01)
*H04N 19/147* (2014.01)
*H04N 19/14* (2014.01)
*H04N 19/557* (2014.01)

(52) U.S. Cl.
CPC ......... *H04N 19/119* (2014.11); *H04N 19/124* (2014.11); *H04N 19/137* (2014.11); *H04N 19/147* (2014.11); *H04N 19/159* (2014.11); *H04N 19/167* (2014.11); *H04N 19/17* (2014.11); *H04N 19/172* (2014.11); *H04N 19/176* (2014.11); *H04N 19/192* (2014.11); *H04N 19/45* (2014.11); *H04N 19/543* (2014.11); *H04N 19/573* (2014.11); *H04N 19/14* (2014.11); *H04N 19/557* (2014.11)

(58) Field of Classification Search
CPC .... H04N 19/192; H04N 19/17; H04N 19/137; H04N 19/109; H04N 19/147; H04N 19/124; H04N 19/159; H04N 19/45; H04N 19/172; H04N 19/176; H04N 19/557; H04N 19/14; H04N 19/436; H04N 19/43; G06T 7/251; G06T 7/12; G06T 7/13; G06T 7/136; G06T 7/194
See application file for complete search history.

(56) References Cited

U.S. PATENT DOCUMENTS

| | | | |
|---|---|---|---|
| 2004/0057520 A1 | 3/2004 | Sun | |
| 2008/0240247 A1 | 10/2008 | Lee et al. | |
| 2009/0086814 A1* | 4/2009 | Leontaris | H04N 19/105 375/240.02 |
| 2011/0103480 A1* | 5/2011 | Dane | H04N 19/513 375/240.16 |
| 2015/0364158 A1* | 12/2015 | Gupte | G11B 27/3081 386/223 |
| 2017/0013279 A1* | 1/2017 | Puri | H04N 19/176 |
| 2017/0337711 A1* | 11/2017 | Ratner | H04N 19/176 |
| 2018/0295375 A1* | 10/2018 | Ratner | H04N 19/436 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Wiegand et al; "Affine Multipicture Motion-Compensated Prediction"; IEEE Transactions on Circuits and Systems for Video Technology, vol. 15, No. 2; Feb. 2005; pp. 197-209.

Li et al; "Dual-Feature Warping-based Motion Model Estimation"; https://www.cv-foundation.org/openaccess/content_iccv_2015/papers/Li_Dual-Feature_Warping-Based_Motion_ICCV_2015_paper.pdf; pp. 4283-4291; 2015.

International Search Report and Written Opinion in PCT/US2018/047209, dated Jan. 9, 2019, 17 pgs.

\* cited by examiner

US 10,681,374 B2

DIVERSIFIED MOTION USING MULTIPLE GLOBAL MOTION MODELS

CROSS-REFERENCE TO RELATED APPLICATION(S)

This application claims priority to and the benefit of U.S. Provisional Application Patent Ser. No. 62/587,025, filed Nov. 16, 2017, the entire disclosure of which is hereby incorporated by reference.

BACKGROUND

Digital video streams may represent video using a sequence of frames or still images. Digital video can be used for various applications, including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Encoding based on motion estimation and compensation may be performed by breaking frames or images into blocks that are predicted based on one or more prediction blocks of reference frames. Differences (i.e., residual errors) between blocks and prediction blocks are compressed and encoded in a bitstream. A decoder uses the differences and the reference frames to reconstruct the frames or images.

SUMMARY

A method for encoding a current frame of a video includes jointly determining respective motion models for reference frames and encoding the current frame using the respective motion models. The reference frames are used for encoding the current frame. Jointly determining respective motion models for reference frames includes determining respective aggregated residuals for combinations of candidate motion models and selecting the combination of candidate motion models that corresponds to the smallest aggregated residual. The respective motion models correspond to the candidate motion models of the selected combination.

An apparatus for encoding a current frame of a video according to another aspect of the disclosure includes a processor and a non-transitory storage medium. The processor is configured to execute instructions stored in the non-transitory storage medium to jointly determine motion models for reference frames such that a respective motion model is determined for a respective reference frame, and encode the current frame using the respective motion models.

A method for decoding a current frame includes decoding, from an encoded bitstream, respective motion models for reference frames of the current frame and, in response to determining that a current block of the current frame is encoded using at least one of the respective motion models, decoding the current block using the at least one of the respective motion models. The respective motion models are jointly determined by an encoder.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
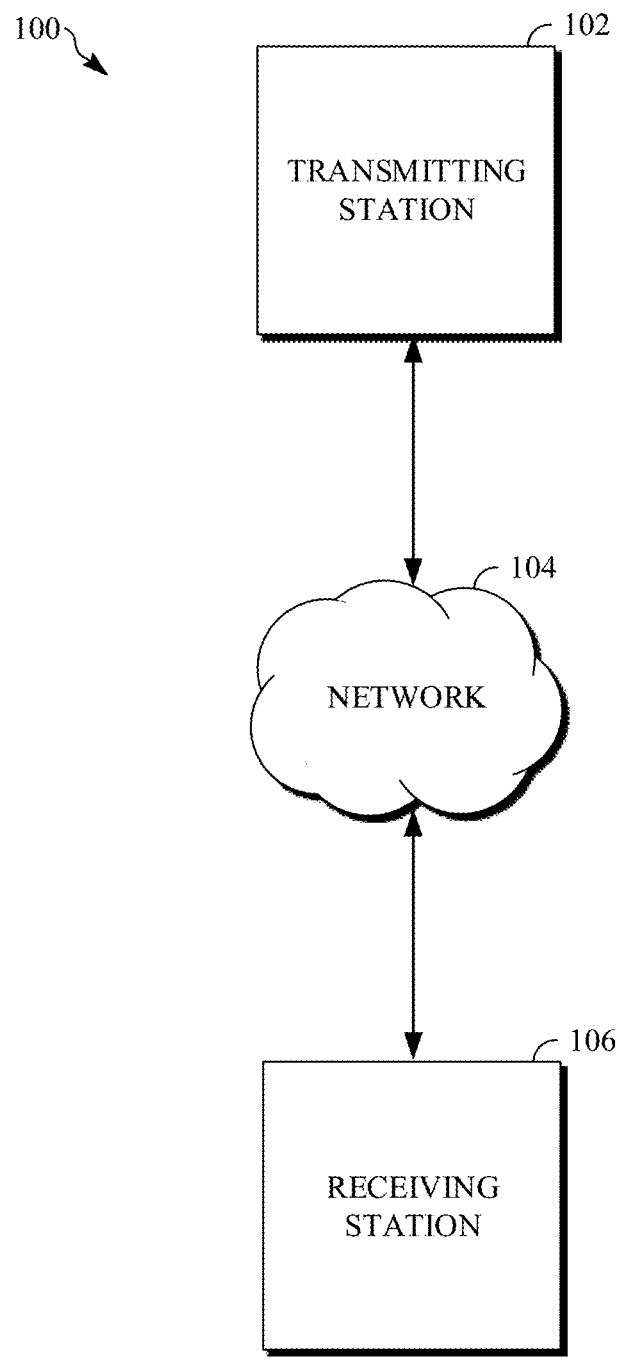
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to recreate the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction attempts to predict the pixel values of a block of a frame of a video stream using pixels peripheral to the block; that is, using pixels that are in the same frame as the block but that are outside the block.

Encoding using temporal similarities can be known as inter prediction. Inter prediction attempts to predict the pixel values of a block of a current frame using a possibly displaced block or blocks from one or more reference frames. A reference frame is a frame (i.e., a picture) that appears earlier or later in time in the video stream than the current frame. A reference frame that appears later in time than the current frame may be received by a decoder before the current frame. For example, the compressed bitstream 420 of FIG. 5 can be organized such that the later-in-time reference frame is included before the current frame. Inter prediction can be performed using a motion vector that represents translational motion, that is, pixel shifts of a prediction block in a reference frame in the x- and y-axes as compared to the block being predicted. Some codecs use up to eight reference frames, which can be stored in a frame buffer. The motion vector can refer to (i.e., use) one of the reference frames of the frame buffer.

Two predictor blocks can be combined to form a compound predictor for a block or region of a video image. A compound predictor can be created by combining two or more predictors determined using, for example, the aforementioned prediction methods (i.e., inter and/or intra prediction). For example, a compound predictor can be a combination of a first predictor and a second predictor, which can be two intra predictors (i.e., intra+intra), an intra predictor and an inter predictor (i.e., intra+inter), or two inter predictors (i.e., inter+inter).

The video compression and decompression methods of motion compensation described above (herein referred to as translational motion compensation or translational motion) assume purely translational motion between blocks. Translational motion compensation models are performed as rectangular transformations. Translational motion determined at the block level is referred to herein as "regular motion compensation."

However, not all motion within a block can be described and/or efficiently described using translational motion models with respect to a reference block of a reference frame. For example, some motion may include scaling, shearing, or rotating motion, either alone or with translational motion. Such motion can be attributed, for example, to camera motion and is applicable to all, or at least many, blocks of a frame. As such, the motion is "global" to a frame. As mentioned and further described below, the global motion can itself be a translational motion. As such, predicting blocks of a current frame using a translational global motion model can result in better performance (e.g., improved compression) than using local translational motion at the block level (i.e., regular motion compensation). In encoding blocks using inter prediction, the global motion may be used to produce a reference block. Alternatively, the translational motion vector(s) found by motion searching can be used.

Global motion may be represented by a "parameterized motion model" or "motion model." A single motion model for each reference frame may not accurately predict all of the underlying motion of the frame. For example, a single motion model for a reference frame performs well with respect to rate-distortion optimization for video with consistent motion. However, a video frame may include two or more moving segments comprising a collection of blocks of the video frame. The segments may comprise, for example, one or more foreground objects moving along different directions and a background that moves along yet another direction. In particular, for example, video with strong parallax may not obtain consistent gains from using the single motion model.

Implementations of this disclosure describe the use of multiple motion models per reference frame. For several reference frames, the current video frame may be segmented with respect to the reference frame, and parameterized motion models may be identified for the segments. Each of the parameterized motion models associated with a segment corresponds to a motion model type. "Segment" as used in connection with global motion, as detailed in the description of FIGS. 6-19, is to be distinguished from a "segment" as used with respect to FIG. 3 below. A "segment" in connection with global motion is a collection of blocks of a current frame that may or may not be contiguous.

In some situations, whether one or more motion models are identified for one or more reference frames, the reference frames may not individually properly describe the global motion in a current frame. As such, it can be advantageous to identify the global motions jointly rather than independently (i.e., on a per reference frame basis). For example, if the global motions associated with a first reference frame accurately describe a first portion of the current frame (e.g., the background of the current frame), then the global motions associated with a second reference frame and/or a third reference frame can be used to describe (i.e., estimate) the global motion of the other portions of the current frame. That is, in determining the motion models of the second and/or the third reference frames, the first portion of the current frame can be ignored, and motion models that fit the other portions (e.g., the foreground of the current frame) can be derived. By jointly inferring global motion across at least some of the reference frames available for coding a current frame, the error associated with a residual can be reduced. Jointly identified (e.g., inferred, calculated, computed, etc.) global motion models is referred to herein as a diversified motion model.

Further details of techniques for using segmentation-based parameterized motion models for encoding and decoding a current block of a video frame, and further details for jointly inferring global motion (i.e., diversified motion) across at least some of the reference frames available for coding a current frame, are described herein with initial reference to a system in which they can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
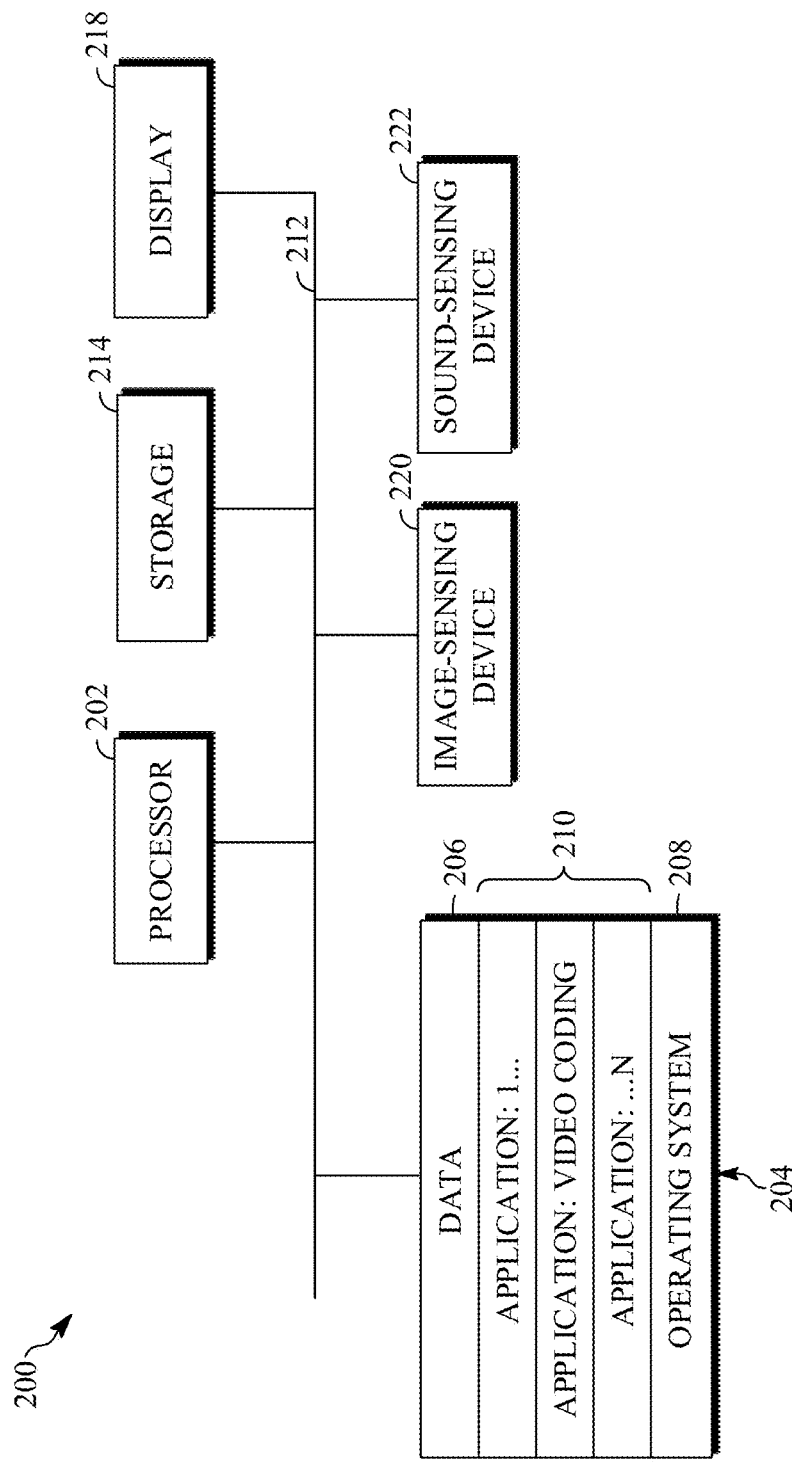
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, for example, a Hypertext Transfer Protocol-based (HTTP-based) video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view, and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, now existing or hereafter developed, capable of manipulating or processing information. Although the disclosed implementations can be practiced with one processor as shown (e.g., the CPU 202), advantages in speed and efficiency can be achieved by using more than one processor.

A memory 204 in the computing device 200 can be a read-only memory (ROM) device or a random-access memory (RAM) device in an implementation. Any other suitable type of storage device can be used as the memory 204. The memory 204 can include code and data 206 that are accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device, now existing or hereafter developed, that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more processors) that can be coupled directly or across a local area or other network. The memory 204 can be distributed across multiple machines, such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit, such as a memory card, or multiple units, such as multiple memory cards. The computing device 200 can thus be implemented in a wide variety of configurations.

Figure 3:
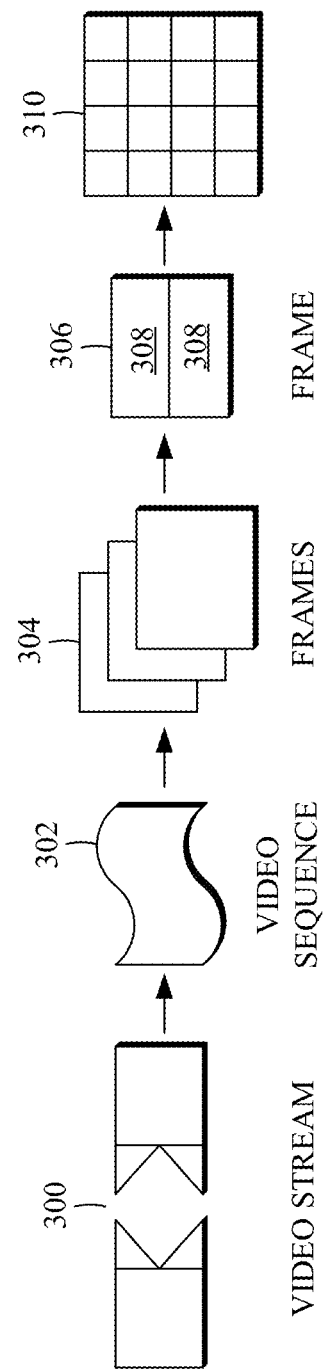
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 64×64 pixels, 128×128 pixels, or larger. Unless otherwise noted, the terms "block" and "macroblock" are used interchangeably herein.

Figure 4:
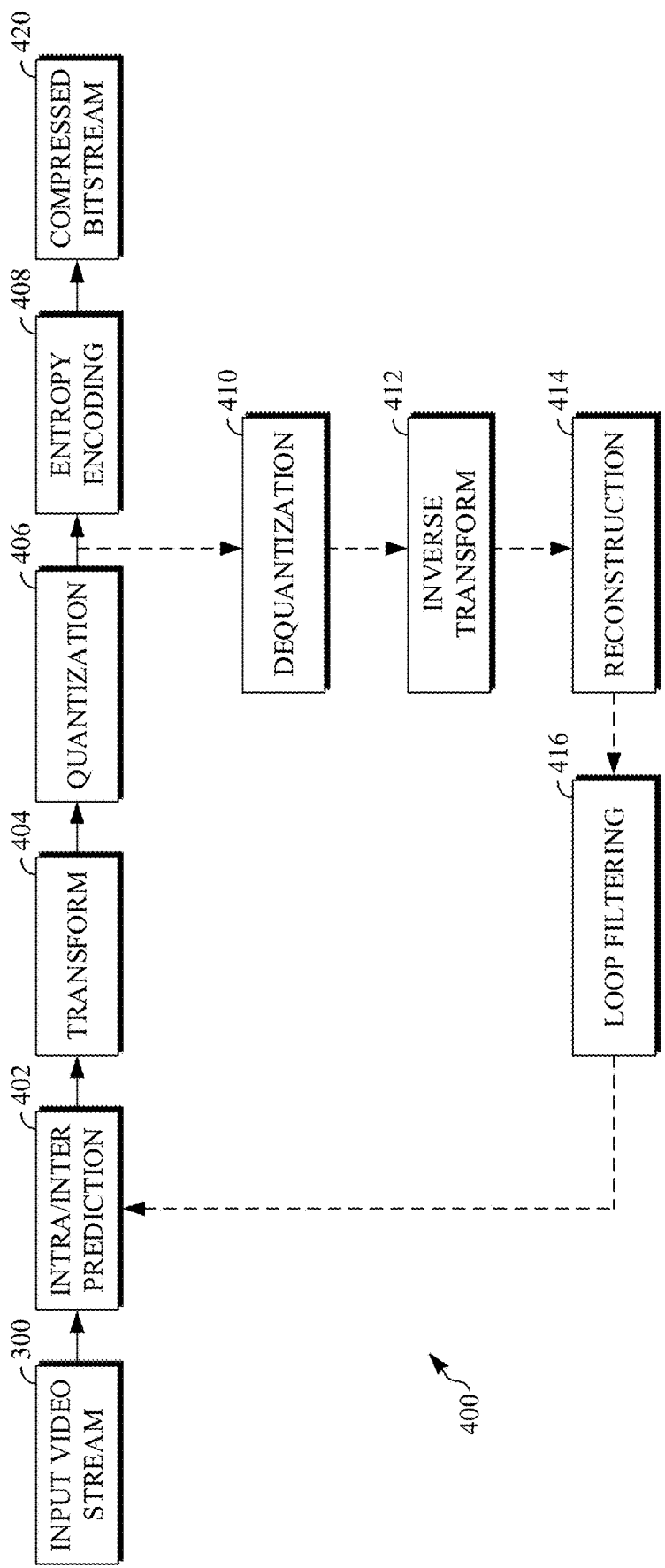
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine-readable instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. Implementations for forming a prediction block are discussed below with respect to FIGS. 6, 7, and 8, for example, using a parameterized motion model identified for encoding a current block of a video frame.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block (which may include, for example, the type of prediction used, transform type, motion vectors, and quantizer value), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process (described below), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
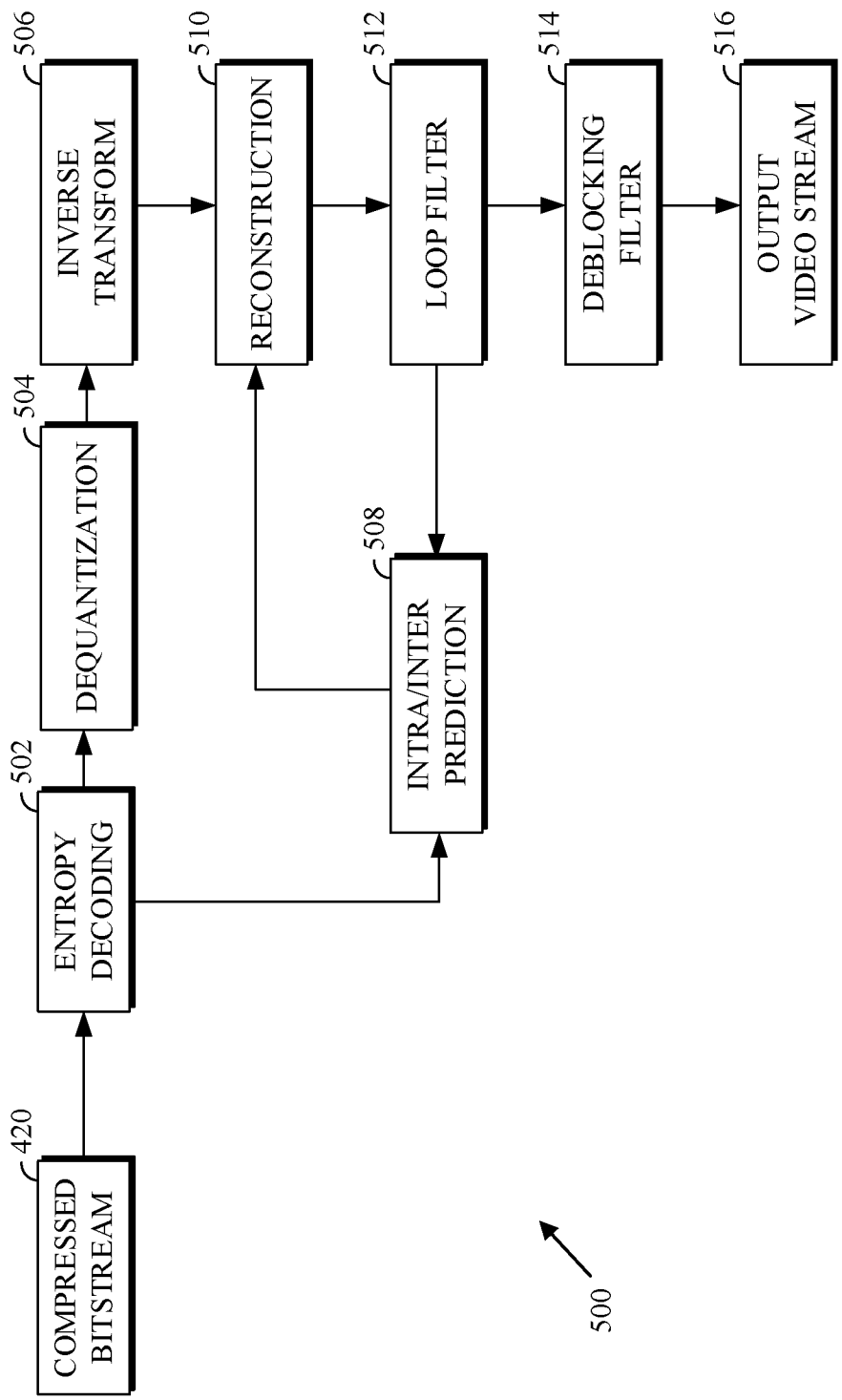
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine-readable instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, for example, at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In an example, the post filtering stage 514 can include a deblocking filter that is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the post filtering stage 514.

Figure 6:
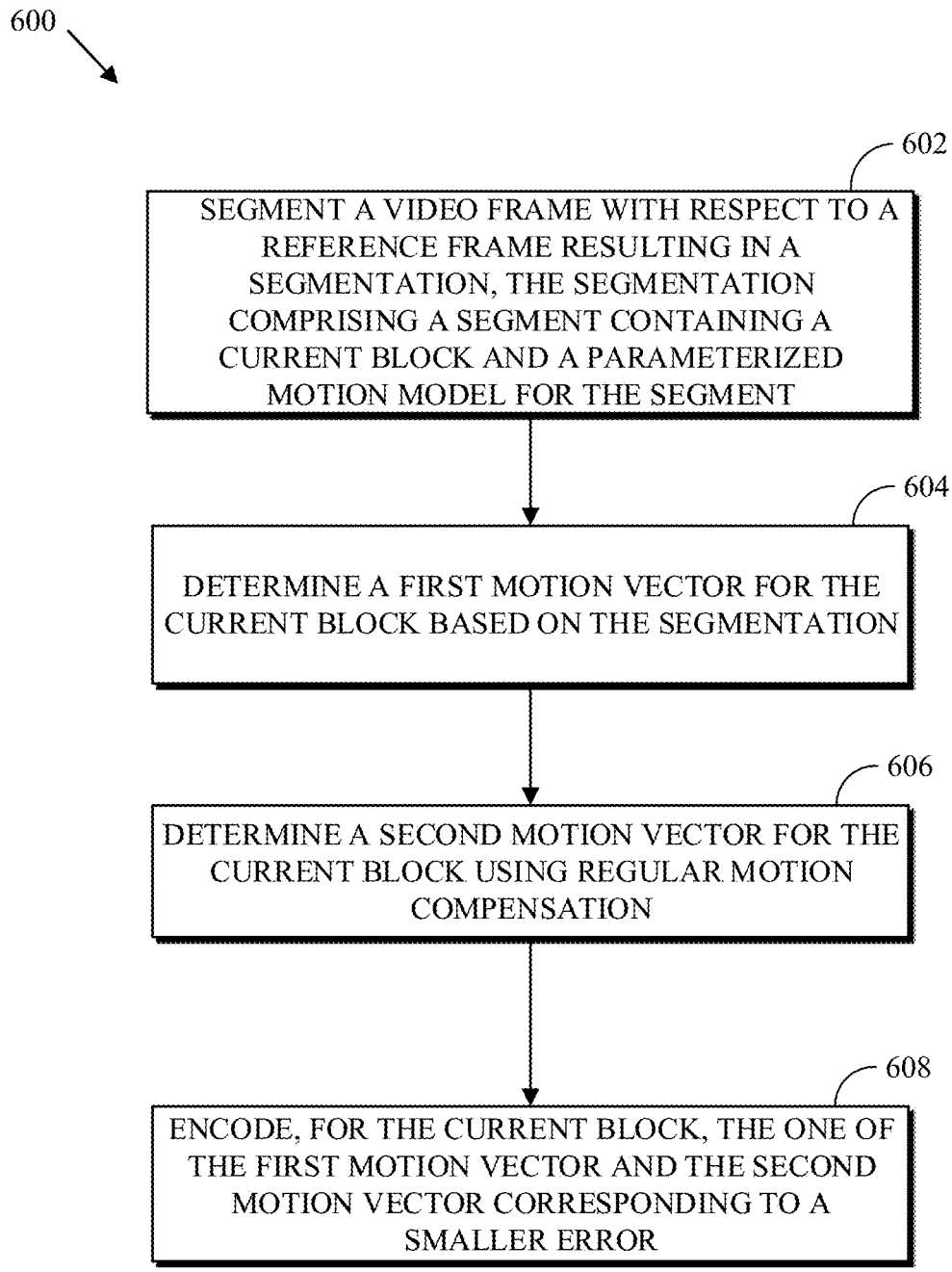
FIG. 6 is a flowchart diagram of a process for encoding a current block using segmentation-based parameterized motion models according to an implementation of this disclosure.

FIG. 6 is a flowchart diagram of a process 600 for encoding a current block using segmentation-based parameterized motion models according to an implementation of this disclosure. The process 600 can be implemented in an encoder such as the encoder 400 of FIG. 4.

The process 600 can be implemented, for example, as a software program that can be executed by a computing device, such as the transmitting station 102. The software program can include machine-readable instructions (e.g., executable instructions) that can be stored in a memory, such as the memory 204 or the secondary storage 214, and that can be executed by a processor, such as the CPU 202, to cause the computing device to perform the process 600. In at least some implementations, the process 600 can be performed in whole or in part by the intra/inter prediction stage 402 of the encoder 400 of FIG. 4.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps or operations.

Figure 7:
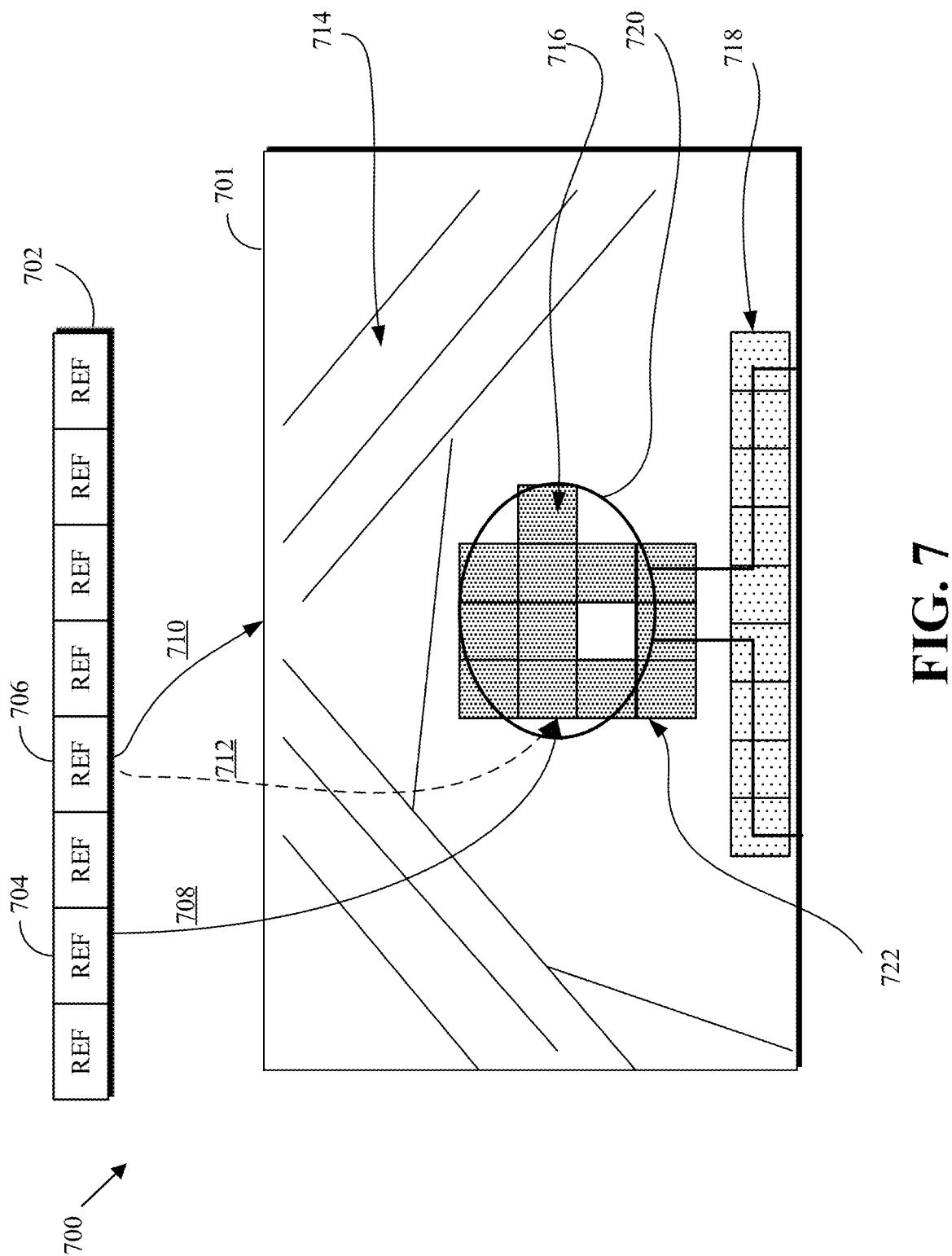
FIG. 7 is a diagram of a frame segmentation according to implementations of this disclosure.

The process 600 is described with reference to FIG. 7. FIG. 7 is a diagram 700 of a frame segmentation according to implementations of this disclosure. FIG. 7 includes a current frame 701. Blocks of the current frame 701 can be encoded using reference frames, such as a reference frame 704 and a reference frame 706, of a frame buffer 702. The current frame 701 includes the head and shoulders of a person 720 and other background objects.

At 602, the process 600 segments the video frame with respect to a reference frame, resulting in a segmentation. The process 600 can segment the video frame with respect to more than one reference frame. The segmentation can include one or more segments. The segmentation includes a segment containing the current block and a parameterized motion model for the segment. FIG. 7 depicts three segments: a segment 722 depicted by a group of shaded blocks, a segment 718 depicted by another group of differently shaded blocks, and a segment 714, which is a group that includes the rest of the blocks of the frame constituting the background of the frame. The segment 722 includes the current block 716.

For each of at least some of the reference frames of the frame buffer 702, the process 600 can segment the current frame 701. The process 600 can use an image segmentation technique that leverages the motion of objects between a reference frame and the current frame. A parameterized motion model is then associated with each segment, as is further described with respect to FIG. 8.

Image segmentation can be performed using interest points to generate the parameterized motion models. For example, the process 600 can determine first interest points in a reference frame, such as the reference frame 704, and second interest points in the current frame 701. The Features from Accelerated Segment Test (FAST) algorithm can be used to determine the first interest points and the second interest points. The first interest points and the second interest points are then matched. The process 600 can use the matched interest points to determine a parameterized motion model for the matching interest points.

The process 600 can use the Random Sample Consensus (RANSAC) method to fit a model (i.e., a parameterized motion model) to the matched points. RANSAC is an iterative algorithm that can be used to estimate model parameters (i.e., the parameters of the parameterized motion model) from data that contain inliers and outliers. Inliers are the data points (i.e., pixels) of the current frame that fit the parameterized motion model. The process 600 can determine a segment based on the inliers. That is, the process 600 can include the inliers in one segment. The segment (referred to as a foreground segment) based on the inliers may correspond to motion in the current frame corresponding to foreground objects. However, that need not be the case. That is, the foreground segment may include background objects or blocks. The foreground segment may not include all foreground objects or blocks.

Outliers are the data points (i.e., pixels) of the current frame that do not fit the parameterized motion model. The process 600 can determine a second segment based on the outliers. The segment (referred to as a background segment) based on the outliers may correspond to relatively static background objects of the current frame. However, that need not be the case. Alternatively, instead of determining a second segment based on the outliers, the process 600 can use the outliers to determine additional segments. For example, the process 600 can recursively apply the same process as described above to determine additional segments. For example, by applying the process as described above to the current frame 701 and using the reference frame 704, the process 600 determines the three segments 714, 718, and 722. The two segments 718 and 722 may be identified for the person 720 in a case where, for example, the shoulders of the person 720 are moving, with respect to a reference frame, in one direction while the head is moving another direction.

The process 600 can determine a parameterized motion model (for example, using RANSAC) based on a motion model type. For example, the RANSAC algorithm can determine a parameterized motion model based on a motion model type provided by the process 600. Different motion model types can be available. Available motion model types include, in increasing complexity, a translational motion model type, a similarity motion model type, an affine motion model type, and a homographic motion model type. Additional or fewer motion model types may be available. Some of the motion model types are explained further with respect to FIGS. 9A-9D.

In some situations, the parameterized motion model determined by the RANSAC method may contain more parameters than are necessary to provide a good approximation (e.g., with respect to an error metric) of the global motion for a segment. For example, requesting an affine model from RANSAC may return a six-parameter model (as described with respect to FIGS. 9A-9D), even though a four-parameter model is sufficient to provide a good approximation of the segment. As such, the process 600 can iteratively evaluate the available model types starting from a least complex model type (e.g., the translational motion model type) to a most complex model (e.g., the homographic motion model type). If a lower complexity model is determined to produce an error metric within a predefined threshold, then the parameterized motion model corresponding to the lower complexity model is determined to be the parameterized motion model of the segment.

In an implementation, an error advantage associated with a model type can be used as the error metric. The error advantage E can be defined as $$E = \Sigma a |c_{xy} - w_{xy}|^{0.6}$$

In the equation above, a is a weight value, $c_{xy}$ is the pixel at (x, y) in the current frame, and $w_{xy}$ is the pixel at (x, y) in the warped frame, as described below. If a model type produces an error advantage E below a predefined threshold, then the parameterized motion model corresponding to the model type is associated with the segment. If no model type produces an error advantage E below the predefined threshold, then the translational motion model type can be assumed for the segment.

In an implementation, the process 600 does not evaluate the homographic motion model type; rather, the process 600 stops at the similarity motion model type. This is so in order to reduce decoder complexity.

The process 600 can segment the current frame with respect to (or based on) each of the reference frames of the frame buffer 702. In FIG. 7, the frame buffer 702 includes eight (8) reference frames. Assuming that the process 600 determines two (2) segments (i.e., a foreground segment and a background segment) per reference frame, the segmentation results in a total of 16 segments. Each of the 16 segments corresponds to a respective parameterized motion model, resulting in 16 parameterized motion models.

As will be explained further with respect to FIG. 8, a prediction block for a current block is determined based on the available segments that contain the current block in the reference frames. As such, if an encoder, such as the encoder 400 of FIG. 4, determines a prediction block using the 16 parameterized motion models, then a decoder, such as the decoder 500 of FIG. 5, also uses the 16 parameterized motion models to reconstruct the current block. As such, the 16 parameterized motion models are encoded in an encoded bitstream, such as the bitstream 420 generated by the encoder 400 and received by the decoder 500.

Encoding, in the encoded bitstream, the parameters of, for example, 16 parameterized motion models may outweigh the prediction gains of segmentation-based parameterized motion models. As such, the process 600 can determine a subset of the reference frames of the frame buffer that results in the best fit for a specific segment. For a segment, a number of reference frames (e.g., three frames) are selected, and the parameterized motion models with respect to these frames are determined and encoded in the encoded bitstream. For example, the process 600 can determine, for a segment, the parameterized motion models based on the golden reference frame, alternative reference frame, and the last reference frame of the frame buffer. The golden reference frame can be a reference frame available as a forward prediction frame for encoding a current frame. The last reference frame can be available as a forward prediction frame for encoding the current frame. The alternative reference frame can be available as a backward reference frame for encoding the current frame.

Encoding a parameterized motion model can mean encoding the parameters of the parameterized motion model in the header of the current frame being encoded. Encoding the parameterized motion model can include encoding the motion model type corresponding to the parameterized motion model.

In the case where the motion model type is encoded, a decoder, such as the decoder 500 of FIG. 5, decodes the motion model type and determines the parameters of the parameterized motion model of the motion model type in a way similar to that of the encoder. In order to limit decoder complexity, the encoder can encode a motion model type that is less complex than the most complex motion model type. That is, for example, the encoder can determine a parameterized motion model for a segment using a motion model type no more complex than the similarity motion model type.

Referring again to FIG. 7, the foreground segment 722 is obtained from the reference frame 704 (as indicated by line 708). The background segment 714 is obtained from the reference frame 706 (as indicated by line 710). That is, each segment can be obtained from a different reference frame. However, this is not necessary. Some of the segments can be obtained from the same reference frames. For example, and as illustrated in FIG. 7, the foreground segment 722 and the background segment 714 can be obtained from the same reference frame 706 (as indicated by the line 712 and the line 710, respectively). The segment 718, while not specifically indicated in FIG. 7, can also be obtained from any of the reference frames of the frame buffer 702.

Figure 8:
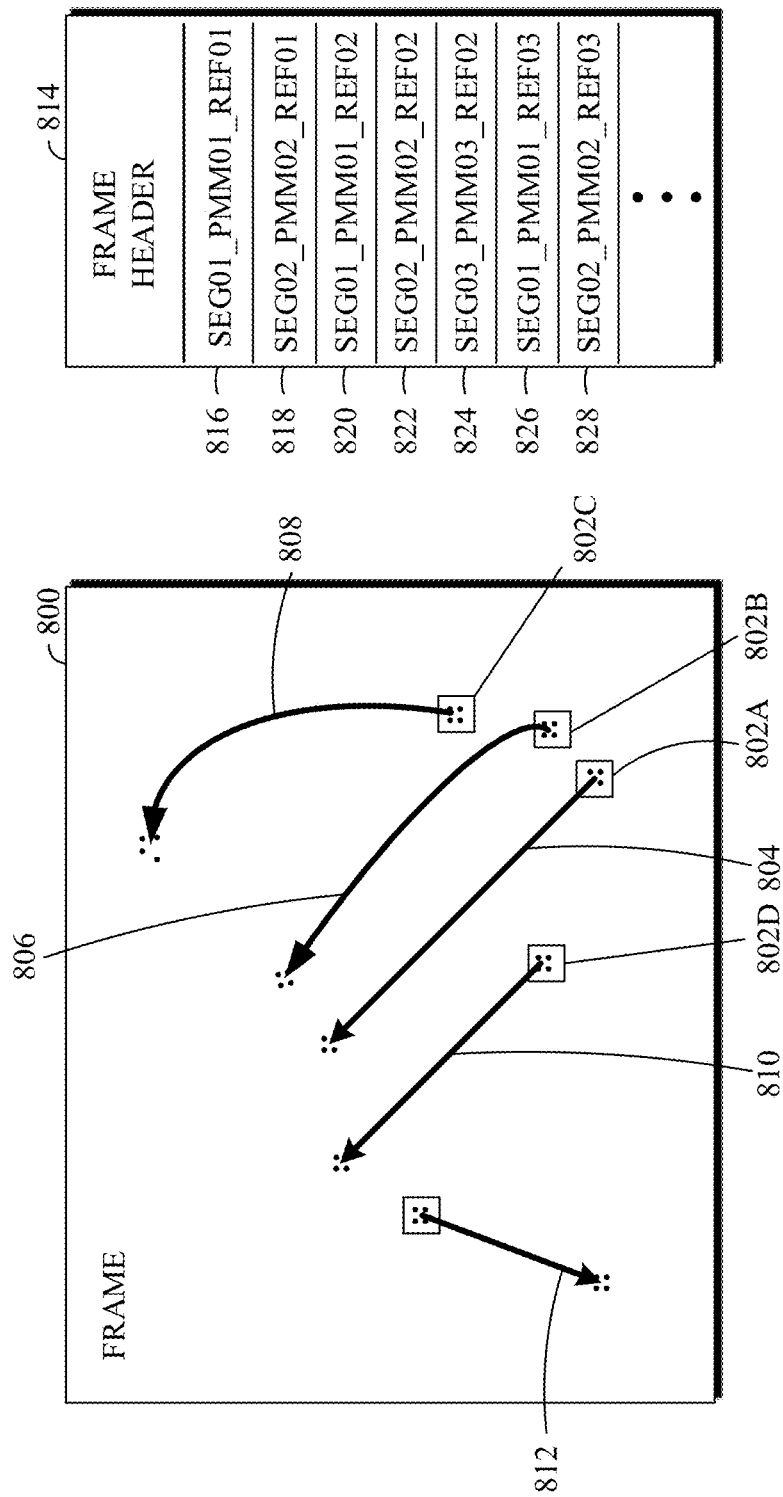
FIG. 8 is an illustration of examples of motion within a video frame according to implementations of this disclosure.

FIG. 8 is an illustration of examples of motion within a video frame 800 according to implementations of this disclosure. While not specifically indicated, it should be understood that the end points of the motion directions (e.g., motion 808) of FIG. 8 refer to pixel positions within reference frames. This is so because motion is described with respect to another frame, such as a reference frame. The illustrated end points may not be end points in the same reference frame. One or more of blocks 802 within the video frame 800 can include warped motion. Warped motion is motion that might not be accurately predicted using motion vectors determined via translational motion compensation (e.g., regular motion compensation as described above). For example, the motion within one of the blocks 802 might scale, rotate, or otherwise move in a not entirely linear manner in any number of different directions. Alternatively, the motion within one of the blocks 802 may be translational motion that is more efficiently described using global translational motion. As such, a prediction block used to encode or decode one of the blocks 802 can be formed, or generated, using a parameterized motion model.

Motion within the video frame 800 may include a global motion. A video frame can contain more than one global motion. Blocks exhibiting the same global motion can be grouped into a segment. The segments may or may include contiguous and/or non-contiguous blocks.

The video frame 800 includes motion at 804, 806, and 808. The motion at 804, 806, and 808 demonstrate, respectively, motion of pixels of the blocks 802A, 802B, and 802C. For example, the motion shown at 804 is a translational motion of the pixels of the block 802A. The motion shown at 806 is a rotational motion of the pixels of the block 802B.

The motion shown at 808 is a warped motion of the pixels of the block 802C. The group of blocks of the video frame 800 exhibiting the same global motion can be grouped into one segment. For example, the motion 810 of the block 802D is the same as the motion of the block 802A. As such, the blocks 802A and 802D can be included in a same segment. More than one global motion can be associated with the frame. Each global motion can be associated with a segment of the frame. The blocks 802A-802D are illustrated, for simplicity, as including four pixels. However, as described above, the blocks can include a larger number of pixels.

In addition to the global motions, the video frame 800 may have local motion within a portion of the video frame 800. For example, a local motion is shown at 812. Local motion within the video frame 800 may be contained within one block or within a number of adjacent or non-adjacent blocks. The video frame 800 may include multiple different local motions.

A frame header 814 of the video frame 800 includes references to reference frames available for encoding or decoding the blocks 802A-802D. The references to the reference frames in the frame header 814 can be for a parameterized motion model associated with those reference frames. A parameterized motion model corresponds to a motion model type (described later with respect to FIGS. 9A-D) and indicates how pixels of blocks (e.g., the blocks 802A-802D) of the video frame 800 can be warped to generate prediction blocks usable for encoding or decoding the blocks. The frame header 814 can include one or more parameterized motion models, each corresponding to a segment of the video frame 800.

For example, the parameterized motion model 816 corresponds to a first motion model of a first segment associated with a first reference frame. The parameterized motion model 818 corresponds to a second motion model of a second segment associated with the first reference frame. The parameterized motion model 820 corresponds to a first motion model of a first segment associated with a second reference frame. The parameterized motion model 822 corresponds to a second motion model of a second segment associated with the second reference frame. The parameterized motion model 824 corresponds to a third motion model of a third segment associated with the second reference frame. The parameterized motion model 826 corresponds to a first motion model of a first segment associated with a third reference frame. The parameterized motion model 828 corresponds to a second motion model of a second segment associated with the third reference frame.

The parameterized motion models associated with a reference frame may correspond to one or more motion model types. For example, the parameterized motion model 816 and the parameterized motion model 818 may respectively correspond to a homographic motion model and an affine motion model for the first reference frame. In some implementations, each reference frame can be associated with multiple parameterized motion models of a single motion model type. For example, the parameterized motion model 816 and the parameterized motion model 818 may both correspond to different homographic motion models. However, in some implementations, a reference frame may be limited to one motion model for each motion model type. Further, in some implementations, a reference frame may be limited to a single motion model total. In such a case, that motion model may be replaced in certain situations, such as where a new motion model results in a lower prediction error.

A parameterized motion model may indicate a global motion within multiple frames of a video sequence. As such, the parameterized motion models encoded within the frame header 814 may be used to generate prediction blocks for multiple blocks in multiple frames of a video sequence. The reference frames associated with the parameterized motion models in the frame header 814 may be selected from a reference frame buffer, such as by using bits encoded to the frame header 814. For example, the bits encoded to the frame header 814 may point to virtual index locations of the reference frames within the reference frame buffer.

FIGS. 9A-D are illustrations of examples of warping pixels of a block of a video frame according to a parameterized motion model according to implementations of this disclosure. A parameterized motion model used to warp pixels of a block of a frame can correspond to a motion model type. The motion model type that corresponds to a parameterized motion model may be a homographic motion model type, an affine motion model type, a similarity motion model type, or a translational motion model type. The parameterized motion model to use can be indicated by data associated with reference frames, such as within frame headers of an encoded bitstream.

FIGS. 9A-D depict different motion model types used to project pixels of a block to a warped patch within a reference frame. The warped patch can be used to generate a prediction block for encoding or decoding that block. A parameterized motion model indicates how the pixels of a block are to be scaled, rotated, or otherwise moved when projected into the reference frame. Data indicative of pixel projections can be used to identify parameterized motion models corresponding to a respective motion model. The number and function of the parameters of a parameterized motion model depend upon the specific projection used.

Figure 9A:
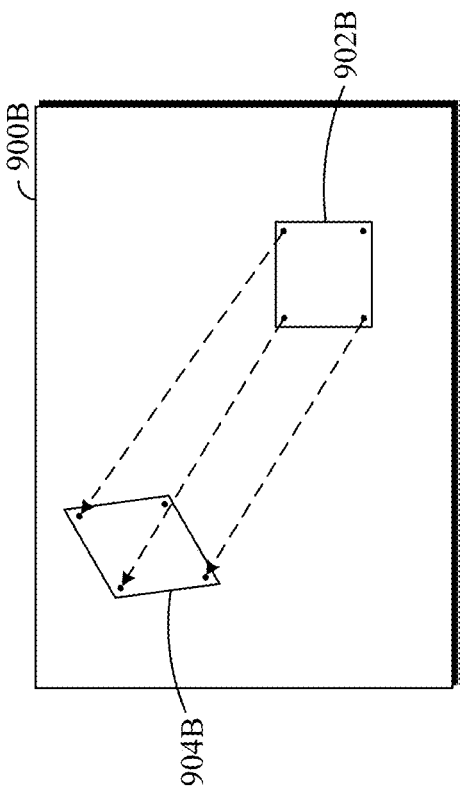
FIGS. 9A-D are illustrations of examples of warping pixels of a block of a video frame according to a parameterized motion model according to implementations of this disclosure.

In FIG. 9A, pixels of a block 902A are projected to a warped patch 904A of a frame 900A using a homographic motion model. A homographic motion model uses eight parameters to project the pixels of the block 902A to the warped patch 904A. A homographic motion is not bound by a linear transformation between the coordinates of two spaces. As such, the eight parameters that define a homographic motion model can be used to project pixels of the block 902A to a quadrilateral patch (e.g., the warped patch 904A) within the frame 900A. Homographic motion models thus support translation, rotation, scaling, changes in aspect ratio, shearing, and other non-parallelogram warping. A homographic motion between two spaces is defined as follows:

$$x = \frac{a*X + b*Y + c}{g*X + h*Y + 1}; \text{ and } y = \frac{d*X + e*Y + f}{g*X + h*Y + 1}.$$

In these equations, (x, y) and (X, Y) are coordinates of two spaces, namely, a projected position of a pixel within the frame 900A and an original position of a pixel within the block 902A, respectively. Further, a, b, c, d, e, f, g, and h are the homographic parameters and are real numbers representing a relationship between positions of respective pixels within the frame 900A and the block 902A. Of these parameters, a represents a fixed scale factor along the x-axis with the scale of the y-axis remaining unchanged, b represents a scale factor along the x-axis proportional to the y-distance to a center point of the block, c represents a translation along the x-axis, d represents a scale factor along the y-axis proportional to the x-distance to the center point of the block, e represents a fixed scale factor along the y-axis with the scale of the x-axis remaining unchanged, f represents a translation along the y-axis, g represents a proportional scale of factors of the x- and y-axes according to a function of the x-axis, and h represents a proportional scale of factors of the x- and y-axes according to a function of the y-axis.

Figure 9B:
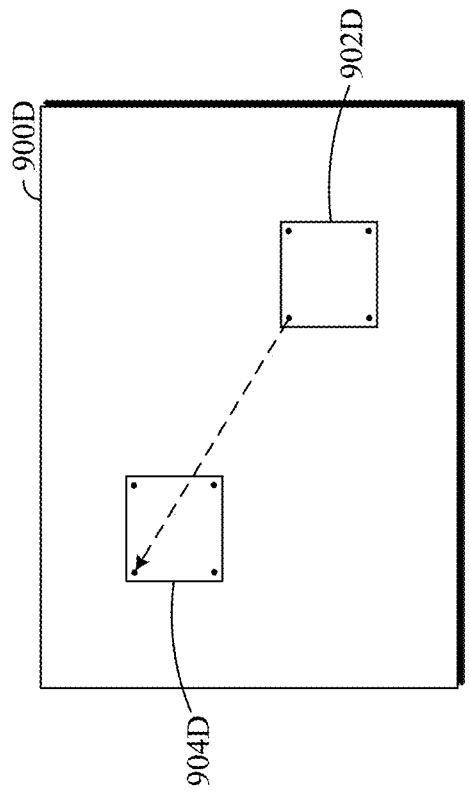

In FIG. 9B, pixels of a block 902B are projected to a warped patch 904B of a frame 900B using an affine motion model. An affine motion model uses six parameters to project the pixels of the block 902B to the warped patch 904B. An affine motion is a linear transformation between the coordinates of two spaces defined by the six parameters. As such, the six parameters that define an affine motion model can be used to project pixels of the block 902B to a parallelogram patch (e.g., the warped patch 904B) within the frame 900B. Affine motion models thus support translation, rotation, scale, changes in aspect ratio, and shearing. The affine projection between two spaces is defined as follows:

$$x=a*X+b*Y+c; \text{ and } y=d*X+e*Y+f.$$

In these equations, (x, y) and (X, Y) are coordinates of two spaces, namely, a projected position of a pixel within the frame 900B and an original position of a pixel within the block 902B, respectively. Also, a, b, c, d, e, and f are affine parameters and are real numbers representing a relationship between positions of respective pixels within the frame 900B and the block 902B. Of these, a and d represent rotational or scaling factors along the x-axis, b and e represent rotational or scaling factors along the y-axis, and c and f respectively represent translation along the x- and y-axes.

Figure 9C:
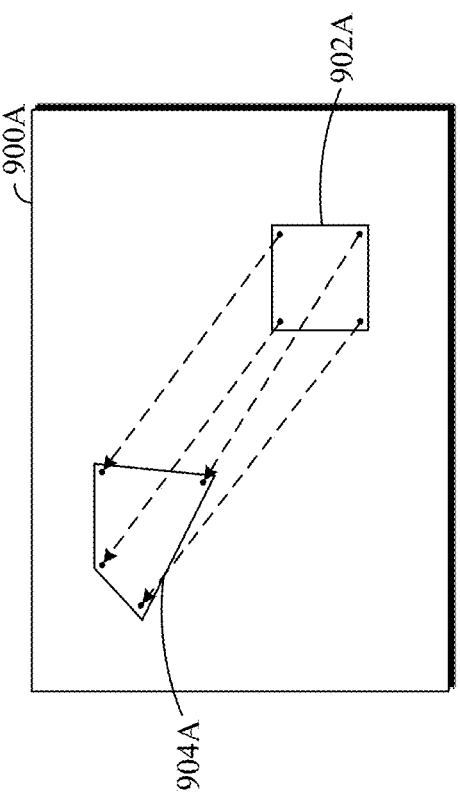

In FIG. 9C, pixels of a block 902C are projected to a warped patch 904C of a frame 900C using a similarity motion model. A similarity motion model uses four parameters to project the pixels of the block 902C to the warped patch 904C. A similarity motion is a linear transformation between the coordinates of two spaces defined by the four parameters. For example, the four parameters can be a translation along the x-axis, a translation along the y-axis, a rotation value, and a zoom value. As such, the four parameters that define a similarity motion model can be used to project pixels of the block 902C to a square patch (e.g., the warped patch 904C) within the frame 900C. Similarity motion models thus support square-to-square transformation with rotation and zoom.

Figure 9D:
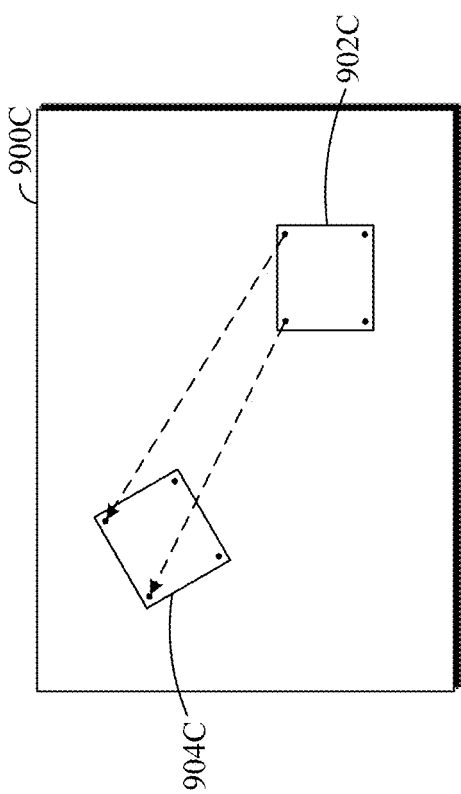

In FIG. 9D, pixels of a block 902D are projected to a warped patch 904D of a frame 900D using a translational motion model. A translational motion model uses two parameters to project the pixels of the block 902D to the warped patch 904D. A translational motion is a linear transformation between the coordinates of two spaces defined by the two parameters. For example, the two parameters can be a translation along the x-axis and a translation along the y-axis. As such, the two parameters that define a translational motion model can be used to project pixels of the block 902D to a square patch (e.g., the warped patch 904D) within the frame 900D.

Returning again to FIG. 6, at 604, the process 600 determines a first motion vector for the current block based on the segmentation. As described above, the video frame can be partitioned with respect to at least some of the reference frames into segments. As such, the current block can be part of many segments, each corresponding to a reference frame. For at least some of the segments that the current frame belongs to, the process 600 determines a respective motion vector.

A motion vector is generated between the current block and a reference frame selected based on the parameterized motion model associated with the segment of the current block as described with respect to FIGS. 7, 8, and 9. As such, the motion vector between the current block and a reference frame selected based on the parameterized motion model can be a reference to the parameterized motion model. That is, the motion vector indicates the reference frame and the parameterized motion model.

The motion vector can be generated by warping pixels of the current block to a warped patch within the reference frame according to the selected parameterized motion model. For example, the pixels of the current block are projected to the warped patch within the reference frame. The shape and size of the warped patch to which the pixels of the current block are projected depends upon the motion model associated with the selected parameterized motion model. The warped patch can be a rectangular patch or a non-rectangular patch. For example, if the parameterized motion model is of a translational motion model type, the warped patch is a rectangular block that is the same size as the current block. In another example, if the parameterized motion model is of a homographic motion model type, the warped patch may be any quadrilateral and of any size. The position of the warped patch also depends upon the motion model. For example, the parameters of the parameterized motion model indicate an x-axis and/or y-axis translation for the warped patch. The parameters of the parameterized motion model may further indicate a rotation, zoom, or other motional change for the warped patch.

The warped patch can then be unwarped using the motion vector to return the current block to generate a prediction block. The prediction block can have a rectangular geometry for predicting the current block. For example, unwarping the projected pixels of the warped patch after respective pixels are projected to the warped patch of the reference frame can include projecting the warped patch to a rectangular block using the generated motion vector. The pixel position coordinates of the warped patch of the reference frame can be projected to the rectangular block based on respective coordinate translations to the rectangular block. The resulting rectangular block can be used to generate the prediction block.

At 606, the process 600 determines a second motion vector for the current block using translational motion compensation at the block level (i.e., regular motion compensation). That is, the process 600 can determine the second motion vector using inter prediction as described above.

At 608, the process 600 encodes, for the current block, the one of the first motion vector and the second motion vector corresponding to a smaller error. The smaller error can be the error corresponding to the best rate-distortion value. A rate-distortion value refers to a ratio that balances an amount of distortion (i.e., loss in video quality) with rate (i.e., the number of bits) used for encoding. For each of the motion vectors determined at 604 and 606, the process 600 can determine the motion vector corresponding to the best rate-distortion value.

The process 600 can encode, in the encoded bitstream, the selected motion vector. In the case where the selected motion vector is a segmentation-based motion vector (i.e., a motion vector determined at 604), the process 600 can encode the parameters of the parameterized motion model used to determine the motion vector. Alternatively, the process 600 can encode the motion model type corresponding to the parameterized motion model.

Figure 10:
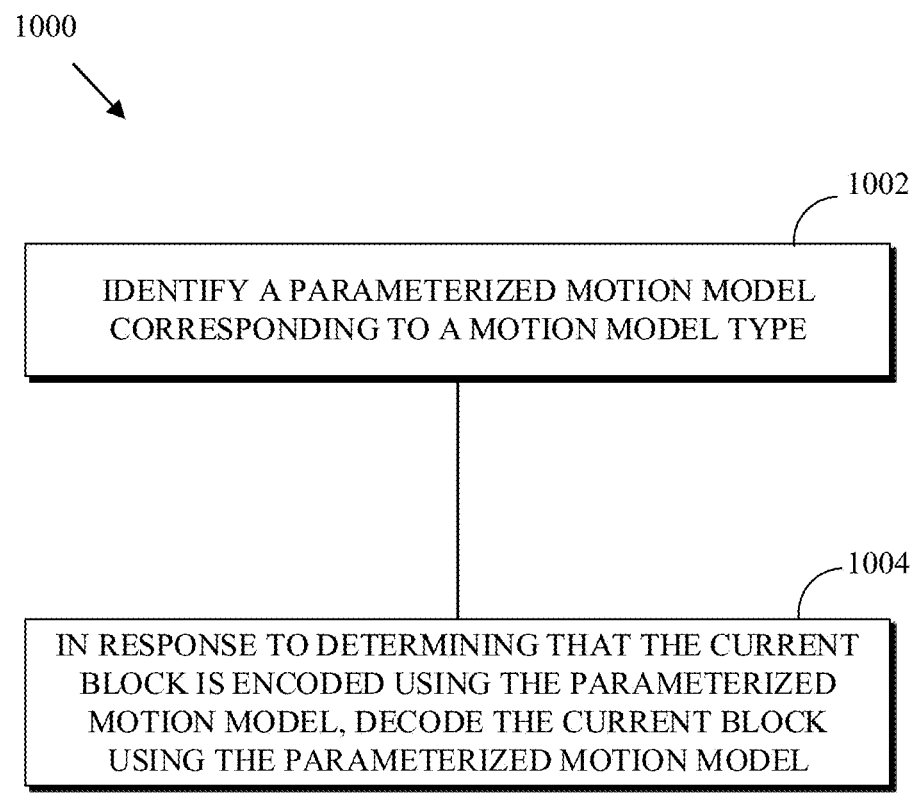
FIG. 10 is a flowchart diagram of a process for decoding a current block using segmentation-based parameterized motion models according to an implementation of this disclosure.

FIG. 10 is a flowchart diagram of a process 1000 for decoding a current block using segmentation-based parameterized motion models according to an implementation of this disclosure. The process 1000 receives an encoded bitstream, such as the compressed bitstream 420 of FIG. 5. The process 1000 may be performed by a decoder. For example, the process 1000 can be performed in whole or in part by the intra/inter-prediction stage 508 of the decoder 500. The process 1000 can be performed in whole or in part during the reconstruction path (shown by the dotted connection lines) of the encoder 400 of FIG. 4. Implementations of the process 1000 can be performed by storing instructions in a memory, such as the memory 204 of the receiving station 106 or the transmitting station 102, to be executed by a processor, such as the CPU 202, for example.

The process 1000 can be implemented using specialized hardware or firmware. Some computing devices can have multiple memories, multiple processors, or both. The steps or operations of the process 1000 can be distributed using different processors, memories, or both. For simplicity of explanation, the process 1000 is depicted and described as a series of steps or operations. However, the teachings in accordance with this disclosure can occur in various orders and/or concurrently. Additionally, steps or operations in accordance with this disclosure may occur with other steps or operations not presented and described herein. Furthermore, not all illustrated steps or operations may be used to implement a method in accordance with the disclosed subject matter.

At 1002, the process 1000 identifies a parameterized motion model corresponding to a motion model type. The parameterized motion model can be identified based on information encoded in a header of a current frame (i.e., a frame header) being decoded. The current frame being decoded is a frame containing the current block.

The process 1000 can identify the parameterized motion model by decoding the parameters of the parameterized motion model from the encoded bitstream. Decoding the parameters of the parameterized motion model can include decoding a motion model type from the encoded bitstream. The process 1000 can then generate the parameters of the parameterized motion model corresponding to the motion model type. The process 1000 can determine the parameters of the parameterized motion model as described above with respect to FIG. 6.

At 1004, the process 1000 decodes the current block using the parameterized motion model in response to determining that the current block is encoded using the parameterized motion model. The current block header can include an indication identifying that the current block is encoded using the parameterized motion model. For example, the current block header can include an indicator of a global motion model type used to encode the current block. For example, the indicator can indicate that global motion was used to encode the current block or that no global motion was used to encode the current block (e.g., zero global motion).

In response to determining that the current block is encoded using the parameterized motion model, the process 1000 decodes the current block using the parameterized motion model. In response to determining that the current block is not encoded using the parameterized motion model, the process 1000 decodes the current block using translational motion compensation.

The frame header for an inter-frame frame of the video sequence can include data indicating one or more parameterized motion models usable to encode or decode one or more blocks thereof. For example, the data encoded to the frame header of an inter-frame frame can include the parameters of a parameterized motion model. The data may also include a coded flag indicating a number of parameterized motion models available to the inter-frame frame.

In some implementations, a reference frame may not have a parameterized motion model. For example, there may be too many distinct motions within the reference frame to identify a global motion. In another example, the prediction errors determined for warped pixels based on motion models may not satisfy the threshold. In such a case, blocks of frames using that reference frame can be encoded or decoded using zero motion. A zero motion model may by default be encoded to the frame header of all or some of the inter-frame frames of a video sequence.

In some implementations, a current block encoded using a parameterized motion model is decoded by warping the pixels of the encoded block according to the parameterized motion model. The warped pixels of the encoded block are then interpolated. For example, the interpolation can be performed using a 6-tap by 6-tap subpixel filter. In another example, the interpolation can be performed using bicubic interpolation. Bicubic interpolation can include using a 4-tap by 4-tap window to interpolate the subpixel values of an encoded block. Bicubic interpolation can include applying a horizontal sheer and a vertical sheer to an encoded block.

Figure 11:
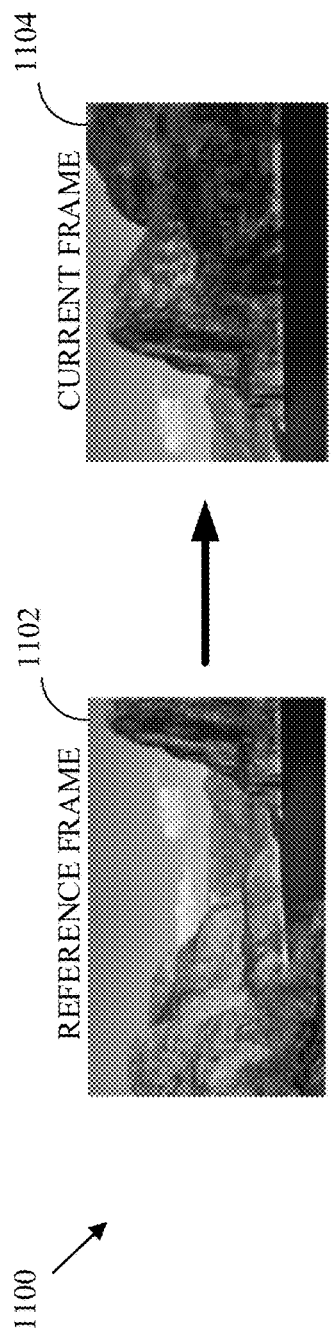
FIG. 11 is an example of global motion according to implementations of this disclosure.

FIG. 11 is an example 1100 of a global motion according to implementations of this disclosure. The example 1100 includes a current frame 1104 and a reference frame 1102. The current frame 1104 and the reference frame 1102 can be frames in a video sequence. The example 1100 illustrates a situation where the camera, rather than objects being captured by the camera, is moving. As indicated above, the camera movement can include translations, rotations, zooms, shears, etc.

As also described above, a global motion (i.e., a parameterized motion model) for a reference frame of a current frame can be used to encode at least a segment of the current frame. The global motion can be encoded, in an encoded bitstream, in the frame header of a current frame so that a decoder can use the global motion to decode at least a segment of the current frame.

Figure 12:
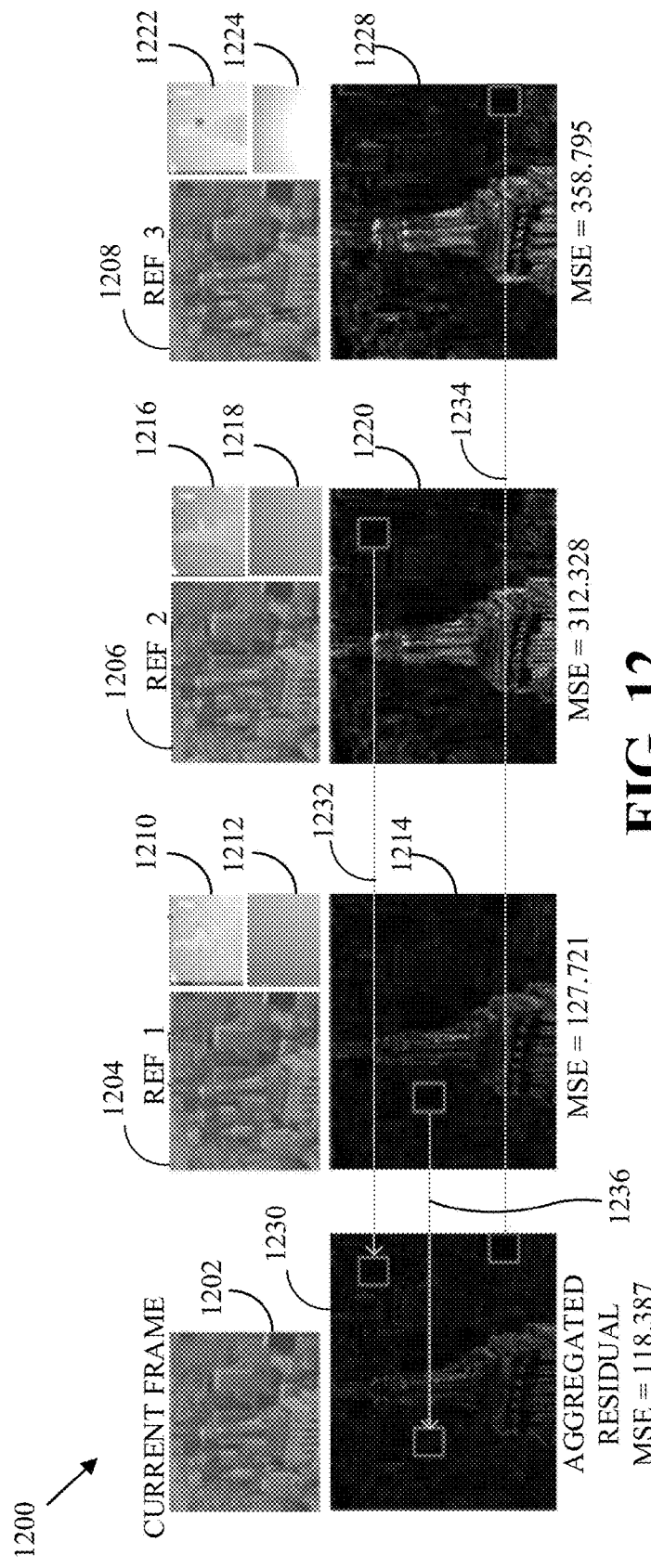
FIG. 12 is an example of encoding a current frame using global motion according to implementations of this disclosure.

FIG. 12 is an example 1200 of encoding a current frame using global motion according to implementations of this disclosure. The example 1200 includes a current frame 1202 to be encoded and reference frames REF_1 1204, REF_2 1206, and REF_3 1208. The current frame 1202 can be encoded using any, or any combination, of the reference frames 1204, 1206, and/or 1208. The example 1200 includes optical flows 1210, 1216, 1222, global motions 1212, 1218, 1224, an aggregated residual 1230, and residuals 1214, 1220, 1228. While not shown as such in FIG. 12, the current frame 1202, the reference frames REF_1 1204, REF_2 1206, REF_3 1208, the optical flows 1210, 1216, 1222, and the global motions 1212, 1218, 1224 have the same size. The aggregated residual 1230 and the residuals 1214, 1220, 1228 illustrate partial residual blocks that are enlarged for clarity and visualization purposes. That is, the aggregated residual 1230 and the residuals 1214, 1220, 1228 illustrate residuals associated with encoding a portion of the current frame 1202. As further described below, the optical flows 1210, 1216, 1222 illustrate motion at the block level; and the global motions 1212, 1218, 1224 illustrate movement induced by global motion.

In the video sequence that includes the current frame 1202 and the reference frames 1204, 1206, 1208, the foreground includes the Empire State Building, and the background depicts other buildings. The video sequence illustrates an example of camera motion where a portion of the frames (e.g., the foreground including the Empire State Building) moves in one direction while the other portions of the frames (e.g., the background) move in another direction. The illustrated movement is slight and may not be easily perceptible. As such, the reference frames can be similar. As such, the global motion models and residuals are also likely to be similar. For simplicity, the example 1200 is described with respect to one global motion model per reference frame. However, in the following descriptions, multiple global motion models per reference frame are understood to apply.

The optical flow 1210 describes the local motion between the current frame and the reference frame REF_1 1204. That is, the optical flow 1210 indicates, for each pixel of the current frame 1202, the movement of the pixel in the reference frame REF_1 1204. Given a pixel in the reference frame REF_1 1204, the optical flow can indicate where the pixel moves in the current frame. As such, for example, one pixel may be determined to move three (3) pixels to the left, while another pixel may be determined to move four (4) pixels to the right.

Similarly, the optical flow 1216 describes the local motion between the current frame and the reference frame REF_2 1206, and the optical flow 1222 describes the local motion between the current frame and the reference frame REF_3 1208. The optical flows 1210, 1216, 1222, as illustrated, indicate that these residuals are concentrated in the foreground of the current frame (i.e., the Empire State Building).

As described above, a global motion (also referred to as a parameterized motion model or a motion model) can have a small number of parameters and can induce a motion on every pixel of the reference frame. For example, assuming a translation to the right, then every pixel of the reference frame can be associated with moving to the right; and assuming a rotation, then every pixel moves a certain distance given by the rotation.

The global motion 1212 illustrates the global motion associated with the reference frame REF_1 1204 with respect to the current frame 1202. The global motion 1212 illustrates the movement of every pixel where the movement is induced by the global motion model associated with the reference frame REF_1 1204. While not important to describe the concepts herein, the gray scales in the global motion 1212 (and the other global motion pictorial in the figures) are intended to depict an amount and direction of global movement.

Similarly, the global motion 1218 illustrates the global motion associated with the reference frame REF_2 1206 with respect to the current frame 1202, and the global motion 1224 illustrates the global motion associated with the reference frame REF_3 1208 with respect to the current frame 1202.

In the example 1200, the gray levels of the global motions 1212, 1218, 1212 are, respectively, more similar to the gray levels of the portions of the optical flows 1210, 1216, 1222 (e.g., the background) than the other portion (e.g., the Empire State Building). Similarly for the optical flows 1210, 1216, 1222. That is, the example 1200 is intended to depict that the global motions describe more of the background of the current frame 1202 than the foreground (i.e., the Empire State Building). This is also illustrated using the residuals 1214, 1220, 1228.

Considering the global motion from the reference frame REF_1 1204 to the current frame 1202, the resulting residual 1214 illustrates that the differences (i.e., the residual) include foreground differences (i.e., the Empire State Building). The global motion from the reference frame REF_1 1204 to the current frame 1202 can be one or more parameterized motion models that make the reference frame REF_1 1204 and the current frame as similar as possible. Similarly, the residuals 1214, 1220 illustrate that the motion models corresponding, respectively, to the global motions 1212, 1218 align more with the background than with the foreground of the current frame 1202. As described above, an error value is typically associated with a residual. The error can be a mean square error between pixel values of the blocks of the current frame and prediction blocks. The error can be a sum of absolute differences error. The error can be a frequency-weighted error, such that high-frequency errors, which have higher coding costs, are weighted higher than low-frequency errors. Any other suitable error measure can be used. In the example 1200, the residuals 1214, 1220, and 1228 are calculated to have respective mean square errors of 127.721, 312.328, and 358.795.

As described above, predicting the current frame 1202 can include predicting each block of the current frame 1202 to determine the aggregated residual 1230. In a simple example, and ignoring local motion (e.g., inter-prediction), and assuming that each block of the current frame 1202 is predicted using global motion, each of the blocks of the current frame 1202 uses as its prediction block the block corresponding to the smallest residual in the reference frames 1204, 1206, 1208. As such, a first block of the current frame 1202 may be predicted from the reference frame REF_2 1206 along a line 1232, a second block may be predicted from the reference frame REF_3 1208 along a line 1234, and a third block may be predicted from the reference frame REF_1 1204 along a line 1236. The aggregated residual 1230 has a corresponding calculated mean square error of 118.387.

As described above and in the example 1200, the global motion models are computed independently. For example, first parameterized motion models that best match first portions of a first reference frame to first portions of a current frame are determined, second parameterized motion models that best match second portions of a first reference frame to second portions of a current frame are determined, etc. Calculating or determining parameterized motion models for a reference frame answers the question: What is the best way of matching the reference frame to the current frame? Given a set of reference frames, the calculating (e.g., identifying, etc.) of one or more parameterized motion models for one reference frame of the set of reference frames does not use results of the calculating of the parameterized motion models for any of the other reference frames.

In some implementations, and as further described below, global motion (i.e., parameterized motion models) of reference frames can be computed jointly. As mentioned above, the jointly computed global motion models can be known as diversified global motion.

For example, if a first global motion associated with a first reference frame (e.g., the reference frame REF_1 1204) accurately (or with sufficient accuracy) describes a first portion (e.g., the background) of a current frame (e.g., the current frame 1202), then determining the global motion associated with other reference frames (e.g., the reference frames REF_2 1206 and REF_3 1208) can ignore the first portion of the current frame and be focused on determining global motion models that best describe the other portions (e.g., the foreground) of the current frame. Similarly, the global motion associated with a second reference frame (e.g., the reference frame REF_2 1206) may be a good descriptor of a second portion of the current frame (e.g., a first portion of the foreground), and the global motion associated with a third reference frame (e.g., the reference frame REF_3 1208) may be a good descriptor of a third portion of the current frame (e.g., a second portion of the foreground).

Figure 13:
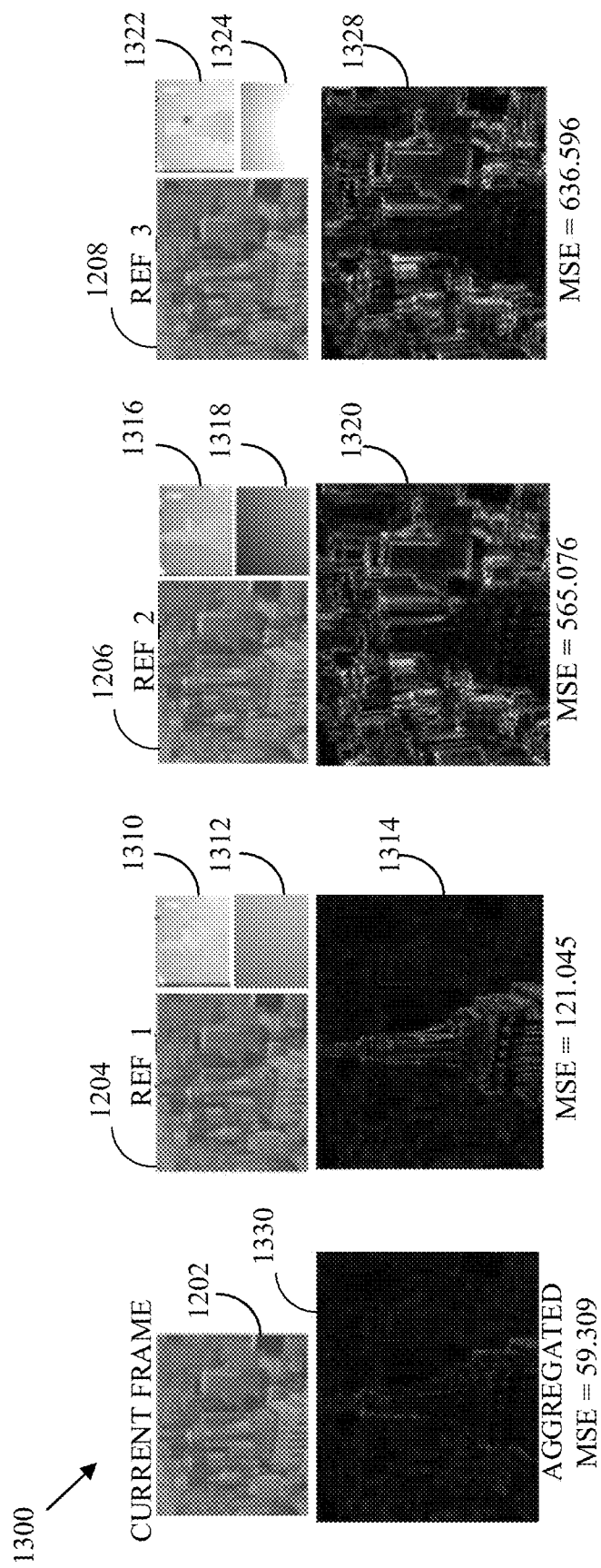
FIG. 13 is an example of diversified global motion according to implementations of this disclosure.

As such, with diversified global motion, and as further described with respect to FIG. 13, given a set of reference frames, any one of the jointly determined global motions associated with the reference frames may not be, by itself, a good overall descriptor of the global motion of a current frame. However, collectively, the jointly determined global motion (i.e., the diversified motion) can better describe the global motions of the current frame because each of the jointly determined global motions can be the best descriptor of a portion of the current frame.

FIG. 13 is an example 1300 of diversified global motion according to implementations of this disclosure. In the example 1300, the same or similar elements as those of FIG. 12 are indicated with the same numerals. The example 1300 illustrates, for the current frame 1202, jointly determined global motions (i.e., diversified motion) associated with each of the reference frames REF_1 1204, REF_2 1206, REF_3 1208.

Global motion 1312 illustrates the global motion associated with the reference frame REF_1 1204. Global motion 1318 illustrates the global motion associated with the reference frame REF_2 1206. Global motion 1324 illustrates the global motion associated with the reference frame REF_3 1208. For simplicity, only one motion model per reference frame is illustrated. However, the motion model associated with a frame can be one or more parameterized motion models, as described above. For example, the global motion associated with a reference frame can be multiple parameterized motion models, each of which describes the motion in a group of blocks (e.g., a segment) of the current frame.

The global motions 1312, 1318, 1324 are jointly determined. Examples of jointly determining the global motions are provided below. Optical flow 1310 illustrates that the global motion 1312 is a good predictor of the background of the current frame 1202. By "good predictor," it is meant that the global motion 1312 describes the motion of the background of the current frame 1202 with sufficient accuracy. The Empire State Building is barely perceptible in the optical flow 1310 and is more washed into the background. Optical flow 1316 illustrates that the global motion 1318 is a good predictor of the foreground of the current frame 1202. The Empire State Building is more perceptible in the optical flow 1316 but is slightly washed into the background. Optical flow 1322 illustrates that the global motion 1324 is a very good predictor of the foreground of the current frame 1202. The Empire State Building is clearly perceptible in the optical flow 1322.

Residual 1314 is the residual resulting from predicting all blocks of the current frame 1202 using the global motion 1312. The residual 1314 has a mean square error (MSE) of 121.045. Residual 1320 is the residual resulting from predicting all blocks of the current frame 1202 using the global motion 1318. The residual 1320 has a mean square error (MSE) of 565.076. Residual 1328 is the residual resulting from predicting all blocks of the current frame 1202 using the global motion 1324. The residual 1328 has a mean square error (MSE) of 636.596. Lighter areas of the residuals 1314, 1320, 1328 indicate higher residual values than residuals associated with darker areas of the residuals 1314, 1320, 1328. The global motions 1318, 1324 generate high residuals for the background as illustrated, respectively, by the residuals 1320, 1328.

Aggregated residual 1330 is the residual that results from predicting the current frame using the diversified global motion. That is, the aggregated residual 1330 is the residual that results from predicting the current frame 1202 using the jointly determined global motions 1312, 1318, 1324. Predicting the current frame 1202 jointly using the global motions 1312, 1318, 1324 means that, as explained above, for each block of the current frame 1202, the best global motion 1312, 1318, 1324 (or other prediction) is selected to predict the block.

Using the diversified global motion to predict the current frame 1202 results in a better prediction (MSE=59.309) than using global motions that are independently determined (MSE=118.387 of FIG. 12).

That is, when not considered jointly, the global motion 1318 (MSE=565.076) associated with the reference frame REF_2 1206 performs worse than the global motion 1218 (MSE=312.328) of FIG. 12; and the global motion 1324 (MSE=636.596) associated with the reference frame REF_3 1286 performs worse than the global motion 1224 (MSE=358.795). The global motions 1318, 1324 result in poor scores (i.e., high residuals) for the entirety of the current frame 1202, when considered separately. However, the global motions 1318, 1324 handle the foreground (e.g., the Empire State Building) well, and thus improve compression. As such, when predicting the current frame 1202, the global motion 1312 can be used to predict blocks that are in the background, and one of the global motions 1318, 1324 can be used to predict blocks that are in the foreground.

Figure 14:
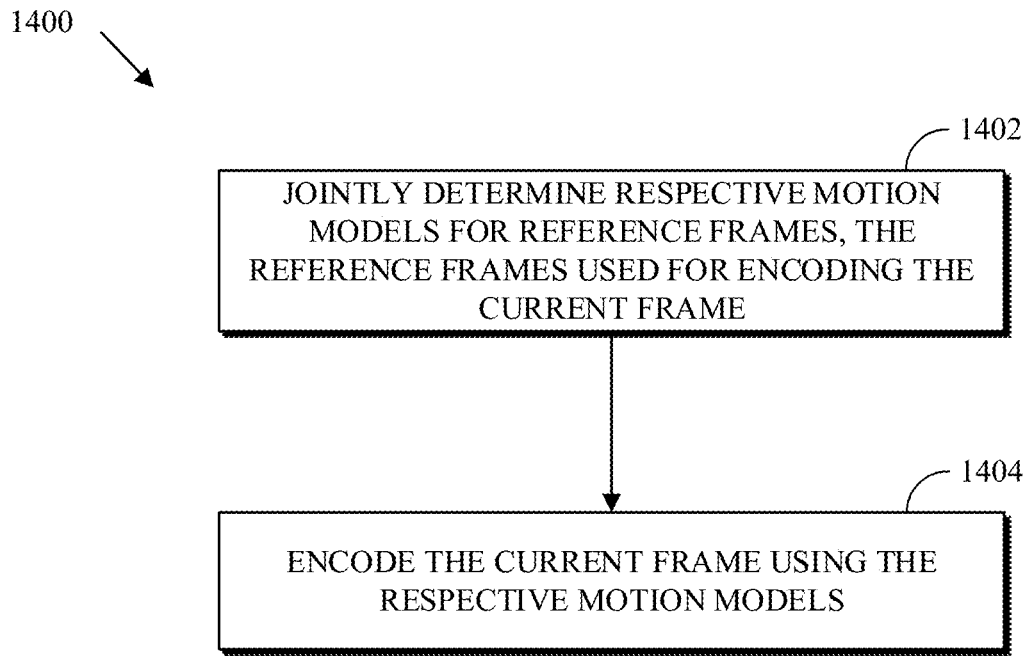
FIG. 14 is a flowchart diagram of a process for encoding a current frame of video using diversified motion according to an implementation of this disclosure.

FIG. 14 is a flowchart diagram of a process 1400 for encoding a current frame of video using diversified motion according to an implementation of this disclosure. Given a set of available reference frames for encoding the current frame, the process 1400 jointly determines, for at least a subset of the available reference frames, respective motion models for encoding the current frame. The determined motion models are global motion models (i.e., parameterized motion models), as described above. The process 1400 then encodes blocks of the current frame using the jointly determined motion models.

The process 1400 can be implemented, for example, as a software program that can be executed by a computing device, such as the transmitting station 102. The software program can include machine-readable instructions (e.g., executable instructions) that can be stored in a memory, such as the memory 204 or the secondary storage 214, and that can be executed by a processor, such as the CPU 202, to cause the computing device to perform the process 1400. The process 1400 can be implemented in an encoder, such as the encoder 400 of FIG. 4. In at least some implementations, the process 1400 can be performed in whole or in part by the intra/inter prediction stage 402 of the encoder 400 of FIG. 4.

The process 1400 can be implemented using specialized hardware or firmware. Some computing devices can have multiple memories, multiple processors, or both. The steps or operations of the process 1400 can be distributed using different processors, memories, or both. Use of the terms "processor" or "memory" in the singular encompasses computing devices that have one processor or one memory as well as devices that have multiple processors or multiple memories that can be used in the performance of some or all of the recited steps or operations.

At 1402, the process 1400 jointly determines respective motion models for reference frames that can be used for encoding the current frame. As used herein, the term "determine" can mean create, construct, form, produce, generate, or determine in any manner whatsoever. The process 1400 can determine respective motion models for all available reference frames or for a subset of the available reference frames. For example, the process 1400 can determine respective motion models for three of the available reference frames. In an example, the three available reference frames can be the golden frame, the alternative reference frame, and the last reference frame. Examples of jointly determining respective motion models for reference frames are provided below with respect to FIGS. 15, 16, and 18.

At 1404, the process encodes the current frame using the respective motion models. Encoding the current frame using the respective motion models can include encoding a current block of the current frame using the global motion model associated with the current block. The associated motion model can be as described with respect to FIG. 15, 17, or 18. In some implementations, a current block can be encoded using the associated global motion model or a motion vector determined using regular motion compensation. That is, a current block can be encoded using the one of the associated motion model and the motion vector resulting from regular motion compensation that results in the smaller residual error. Encoding a current block can mean encoding the current block in an encoded bitstream, such as the compressed bitstream 420 of FIG. 4.

In some implementations, the process 1400 can include additional steps or operations. For example, the process 1400 can encode in an encoded bitstream (such as in the header of the current frame) the determined motion models. The process 1400 can encode the parameters of the determined motion models in the encoded bitstream. In an example, and as described with respect to FIG. 16, for each of three reference frames, four different candidate motion models can be computed. One of the four computed candidate motion models per reference frame may be selected for the encoding of the current frame. As such, the parameters of the selected candidate motion models can be encoded in the compressed bitstream. The selected candidate motion models can be such that they jointly cover the current frame. That is, each block of the current frame can be associated with one of the candidate motion models.

In some implementations, other steps or operations not presented and described herein may be used in the process 1400. Furthermore, not all illustrated steps or operations may be required to implement a technique in accordance with the disclosed subject matter.

Figure 15:
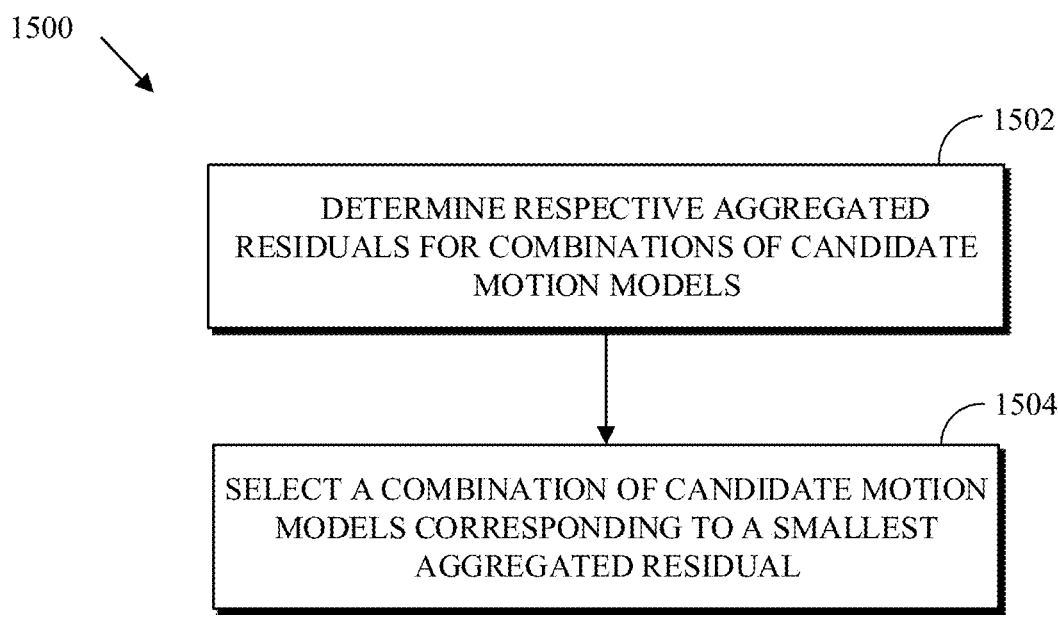
FIG. 15 is a flowchart diagram of a process for jointly determining motion models according to an implementation of this disclosure.

FIG. 15 is a flowchart diagram of a process 1500 for jointly determining motion models according to an implementation of this disclosure. The process 1500 can be implemented at 1402 of the process 1400.

The process 1500 can generate several candidate motion models for each of the reference frames. The process 1500 then selects the best combination of motion models. The best combination is the combination of motion models that results in the smallest aggregated residual for the current frame. In an example, a combination of motion models includes one candidate motion model for each of the reference frames. In another example, a combination of motion models includes zero or more candidate motion models for each of the reference frames. Each of the combinations of motion models corresponds to a diversified motion model. The best combination of motion models is a diversified motion model that is selected for encoding the current frame.

For simplicity of explanation, the process 1500 is described with respect to three reference frames and four candidate motion models per reference frame. However, more or fewer reference frames can be used, and more or fewer candidate motion models can be generated (e.g., identified, computed, etc.) for each reference frame. The same or a different number of candidate motion models can be generated for each reference frame. The candidate motion models are not necessarily optimal motion models. That is, the candidate motion models do not necessarily have to result in the smallest MSEs for the current frame as a whole.

The process 1500 can be described as a two-stage process: In the first stage, several (e.g., four) candidate motion models for each current frame/reference frame pair are independently generated; in the second stage, a joint optimization over all the reference frames is performed to select one collective motion (i.e., a combination of motion models) to be used to encode the current frame. In an example, the collective motion used to encode the current frame includes, for each reference frame, one global motion model selected from four candidate motion models for the reference frame.

At 1502, the process 1500 determines respective aggregated residuals for combinations of candidate motion models.

In an example, each of the combinations of candidate motion models consists of one respective candidate motion model for each of the reference frames. In another example, each of the combinations of candidate motion models consists of zero or more respective candidate motion models for each of the reference frames. More generally, a combination of candidate motion models can include any number of candidate motion models and the number of candidate motion models is not limited to the number of reference frames.

Determining respective aggregated residuals for combinations of candidate motion models can include generating respective candidate motion models for a reference frame independently of the candidate motion models of other reference frames.

In some implementations of the process 1500, combinations of candidate motion models that do not include one respective candidate motion model for each of the reference frames can be determined at 1502. For example, and using the examples of FIG. 16, combinations that include two, instead of three, candidate motion models can be determined.

Figure 16:
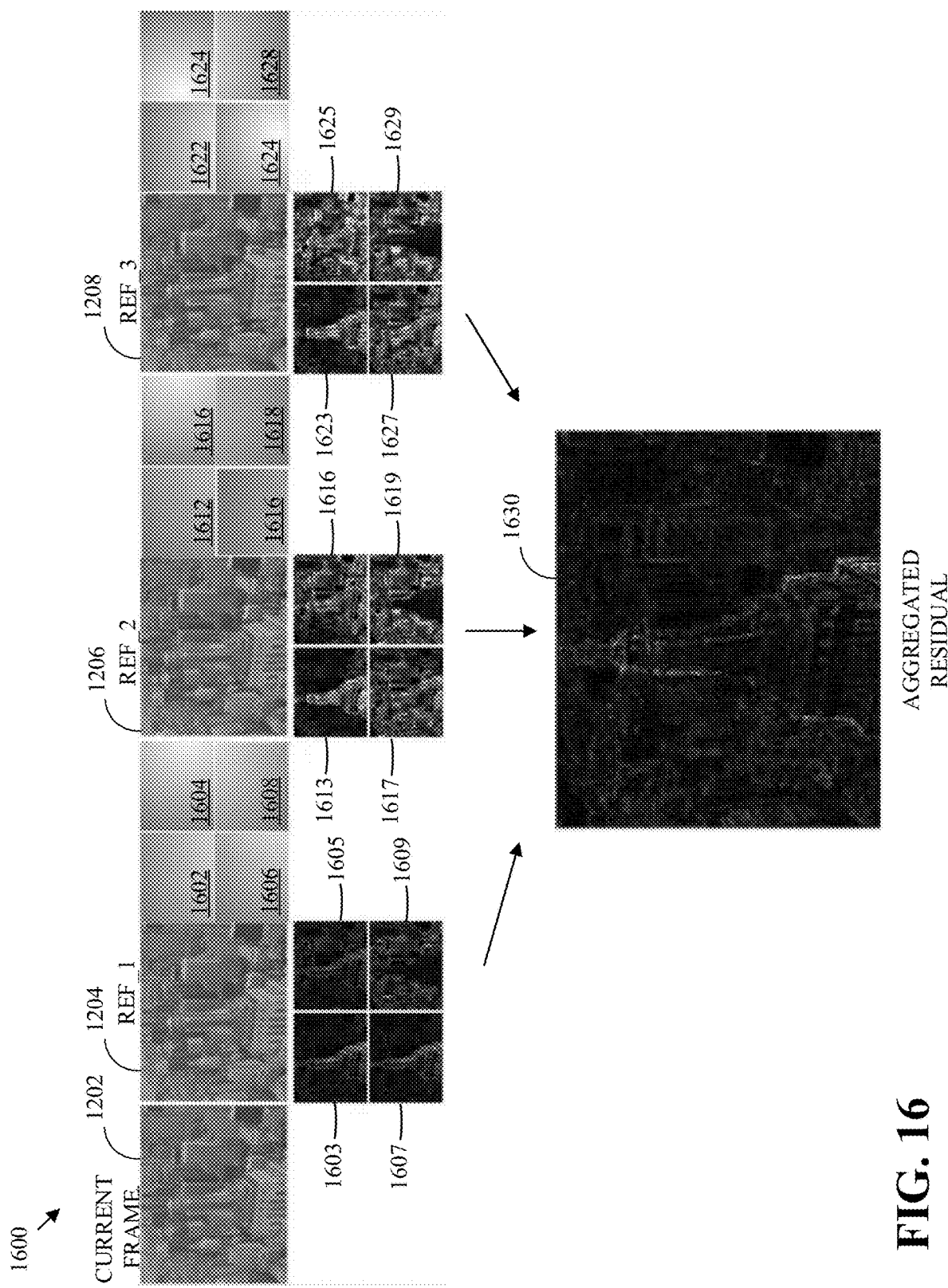
FIG. 16 is an example of combinations of motion models according to implementations of this disclosure.

FIG. 16 is an example 1600 of combinations of motion models according to implementations of this disclosure. In the example 1600, four candidate motion models are generated for the reference frame REF_1 1204, namely, the candidate motion models 1602-1608; four candidate motion models are generated for the reference frame REF_2 1206, namely, the candidate motion models 1612-1618; and four candidate motion models are generated for the reference frame REF_3 1208, namely, the candidate motion models 1622-1628.

The candidate motion models can be generated in any number of ways. For example, the candidate motion models for a reference frame can each correspond to a motion model type (e.g., the translational motion model type, the similarity motion model type, the affine motion model type, and the homographic motion model type). For example, each of the candidate motion models can be generated using a different error advantage. For example, the parameterized motion models associated with different segments of the current frame can be used as the candidate motion models for the reference frame. For example, the current frame can be partitioned into segments, and a parameterized motion model can be determined for each segment. The number of segments can correspond to the number of candidate motion models to be generated. Blocks of the current frame can be assigned to the segments in any way. In an example, a first group of contiguous blocks (e.g., 25% of the blocks) are assigned to a first group, the next group of contiguous blocks are assigned to a second group, and so on.

In an implementation, determining respective aggregated residuals for combinations of candidate motion models can include generating a respective residual for some of the candidate motion models of a reference frame. For example, for each candidate motion model of the generated candidate motion models, the process 1500 can generate the residual that corresponds to predicting the current frame using the candidate motion model and the corresponding reference frame.

FIG. 16 illustrates respective residuals. Residuals 1603-1609 are the residuals that result from predicting the current frame 1202 using, respectively, the candidate motion models 1602-1608. Residuals 1613-1619 are the residuals that result from predicting the current frame 1202 using, respectively, the candidate motion models 1612-1618. Residuals 1623-1629 are the residuals that result from predicting the current frame 1202 using, respectively, the candidate motion models 1622-1628. Predicting the current frame using a candidate motion model can include partitioning the current frame into fixed blocks of size N×M and predicting each of the blocks using the candidate motion model. N and M can be integer values selected from a set that includes the values 4, 8, 16, 32, 64, and 128.

The process 1500 can perform an exhaustive search, jointly, over the reference frames (e.g., the three reference frames REF_1, REF_2, and REF_3) to determine which combination of candidate motion models from the candidate motion models minimizes the reconstruction error of the current frame. In FIG. 16, as four candidate motion models are generated per reference frame, the process 1500 can determine an aggregated residual for each of the 64 (i.e., 4*4*4=64) combinations of candidate motion models. Example combinations of candidate motion models include: candidate motion models 1602, 1612, 1622; candidate motion models 1602, 1612, 1624; candidate motion models 1602, 1612, 1626; candidate motion models 1602, 1612, 1628; candidate motion models 1604, 1612, 1622; candidate motion models 1604, 1612, 1624; candidate motion models 1604, 1612, 1626; candidate motion models 1604, 1612, 1628; and so on.

As mentioned above, in an example, a combination of candidate motion models can include zero or more candidate motion models per reference frame. As such, and assuming that each combination of candidate motion models includes three candidate motion models, then 220 combinations of candidate motion models are possible. The 220 possible combinations correspond to selecting any three candidate motion models of the total of 12 (i.e., candidate motion models 1602-1608, 1612-1618, and 1622-1628) available candidate motion models. Example combinations of candidate motion models include: candidate motion models 1602, 1604, 1606; candidate motion models 1602, 1604, 1622; candidate motion models 1606, 1616, 1628; and so on. In an example where each combination of candidate motion models includes four candidate motion models, examples of combinations of candidate motion models include: candidate motion models 1602, 1604, 1606, 1612; candidate motion models 1602, 1604, 1606, 1608; candidate motion models 1602, 1604, 1612, 1628; and so on.

Whereas this disclosure may refer to selecting one respective candidate motion model for each of the reference frames for simplicity of explanation, it is to be understood, as described above, that a combination of candidate motion models can include zero or more candidate motion models for each reference frame and/or that the number of motion models in combinations of motion models is not limited to the number of reference frames.

The number of motion models per combination can depend on a predetermined desired number of motion models per combination. For example, the predetermined desired number can be an input or a configuration. In another example, a process for encoding a current frame of video using diversified motion, such as the process 1400, can use a range of desired number of motion models. For example, given a range [3-5], the process can generate combinations of 3 motion models, combinations of 4 motion models, and combinations of 5 motion models. The best combination of motion model, as described herein, can be used to encode a frame of video. The number of combinations of motion models can also be an input, a configuration, or the like.

In an implementation, determining respective aggregated residuals for combinations of candidate motion models can include, for a current block, determining a first residual block using the first candidate motion model, determining a second residual block using the second candidate motion model, determining a third residual block using the third candidate motion model, and adding, to an aggregated residual of the current frame, the one of the first residual block, the second residual block, and the third residual block corresponding to a smallest residual block.

For example, for the combination that includes candidate motion models 1608, 1616, 1624, for each block of size 8×8 in the current frame, the process 1500 can select the one of (1608, reference frame REF_1 1204), (1616, reference frame REF_2 1206), (1624, reference frame REF_3 1208) pair that provides the best prediction (i.e., the smallest residual). The smallest residual for each block is added to the aggregated residual of the combination of the candidate motion models. Residual 1630 is an example of an aggregated residual of a combination of candidate motion models.

As described above, the process 1500 can associate a respective aggregated residual with each of the combinations of candidate motion models. At 1504, the process 1500 can select the combination of candidate motion models that corresponds to the smallest aggregated residual. As such, each of the blocks of the current frame can be associated with a global motion model that corresponds to the smallest aggregated error for the current frame.

The diversified motion described herein does not assume or rely on the fact that the reference frames are similar to each other. The diversified motion according to implementations of this disclosure can be used with any set of reference frames.

In some implementations, one or more of the reference frames used for determining a diversified motion model for a current frame may not be displayable frames of the video sequence that includes the current frame.

For example, if a video sequence includes an object of interest (e.g., a famous personality, a landmark, etc.), then frames or images of the object of interest may be included in the video sequence as reference images. These reference images are non-displayable frames because they are not part of the video sequence per se. However, these reference images may be used as reference frames to provide better prediction for those frames (or portions of frames) of the video sequence that include the object of interest. Such reference frames may be used for predicting at least aspects of the object of interest. For example, such reference frames may be used to better predict the hairstyle (e.g., an aspect) of a person (e.g., the object of interest).

In some implementations, one or more of the reference frames used for determining a diversified motion model for a current frame may be a frame temporally distant from the current frame. Typically, reference frames used for predicting a current frame are frames that are temporally proximate to the current frame. However, a reference frame used to determine a diversified motion model can be a temporally distant frame.

For example, assume a panoramic video sequence of a landscape is taken. The panoramic video sequence includes a first frame that includes an aspect of the landscape (e.g., a rock formation). A second frame that is taken 10 minutes later and a third frame that is taken 12 minutes later also include the same aspect. In typical prediction techniques, the first frame would not be used as a reference frame for predicting the second and/or third frames. However, using diversified motion models according to implementations of this disclosure, the first frame can be used as a reference frame for predicting the aspect of the landscape in the second and third frames, even though the first frame is temporally distant from the second and third frames. The first frame can be tagged (e.g., identified, selected, and the like) as a reference frame for predicting frames that include the aspect.

In the process 1500 of jointly determining motion models, the candidate motion models for a reference frame are selected independently of the candidate motion models of other reference frames. In other examples, and as further described with respect to FIGS. 17-18, jointly determining motion models can generate one or more candidate motion models of a reference frame using information available about the candidate motion models of the other reference frames. That is, all reference frames (e.g., candidate motion models of all the reference frames) can be used simultaneously to determine the diversified motion model.

Figure 17:
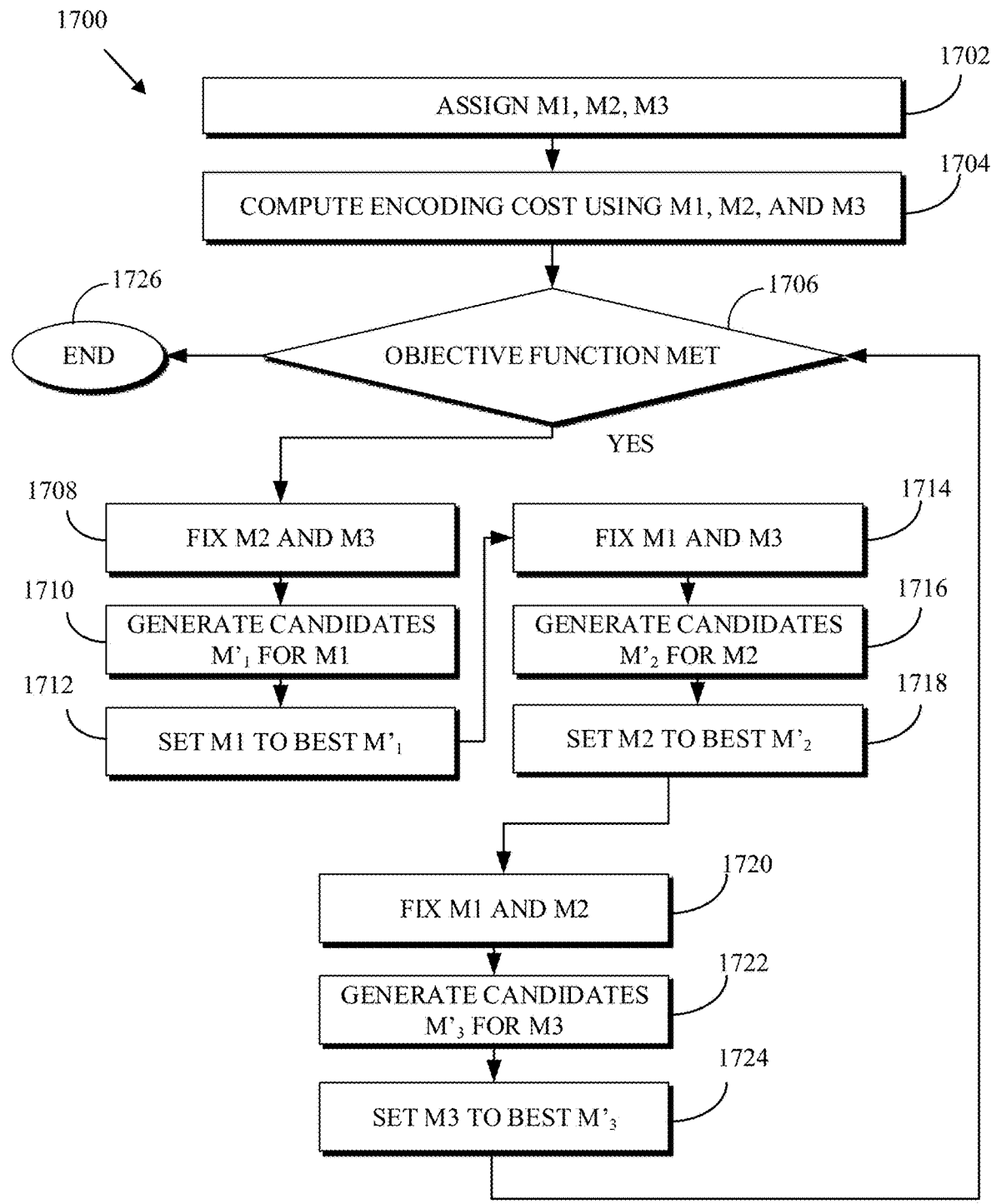
FIG. 17 is a flowchart diagram of a process for jointly determining motion models according to another implementation of this disclosure.

FIG. 17 is a flowchart diagram of a process 1700 for jointly determining motion models according to another implementation of this disclosure. The process 1700 is described with respect to three reference frames. However, any number of reference frames can be available.

In an example, for each of the reference frames, the process 1700 assigns a respective initial motion model. In another example, a reference frame can be assigned zero or more initial motion models. The process 1700 then iteratively refines one of the motion models by fixing the other two motion models. The process 1700 iterates until an objective function is met. Depending on the semantics of the objective function, "until the objective function is met" can mean until the objective function is met, while the objective function is met, until the objective function is not met, while the objective function is not met, or other semantics. The objective function can be any one or more conditions, processing, evaluation, and the like that cause the process 1700 to proceed from 1706 to 1726. At the end of each iteration (and before the first iteration), a current diversified motion model is determined. As such, the current diversified motion model associates a global motion model with each block of the current frame.

At 1702, the process 1700 assigns respective initial motion models to the motion models of the reference frames. Given the reference frames REF_1, REF_2, and REF_3, the process 1700 can assign, respectively, initial motion models M1, M2, and M3. As mentioned above, a reference frame can be assigned zero or more initial motion models. For example, M1 and M2 may correspond to REF_1 and M3 may correspond to REF_3. As such, it is to be understood that the number of initial motion models is not limited by the number of reference frames. For example, the initial motion models may be M1, M2, M3, and M4 where M1 and M3 correspond to REF_1, M2 corresponds to REF_2, and M4 corresponds to REF_3.

The initial motion models can be any motion models generated as described above. The initial motion models do not necessarily have to be the most optimal motion models associated with the corresponding reference frame. For example, the initial motion models can be generated using a least complex model type. For example, the initial motion models can be generated ignoring the error advantages associated with the initial motion models. The combination of motion models M1, M2, M3 constitutes a current diversified motion model.

At 1704, the process 1700 determines a cost of encoding the current frame using the motion models (i.e., using the current diversified motion model). The process 1700 determines the encoding cost for each block of the current frame as the minimum cost among following M1 in REF_1, following M2 in REF_2, and following M3 in REF_3. For example, the process 1700 can determine the residual value (MSE) associated with encoding the blocks of the current frame using the initial motion models (M1, M2, M3).

At 1706, the process 1700 determines whether an objective function is met. If so, the process 1700 ends at 1726. Otherwise, the process 1700 proceeds to 1708 to perform an iteration for improving the current motion models (i.e., the current diversified motion model). That is, the process 1700 iteratively refines (by performing 1708-1724), until the objective function is met, the motion models M1, M2, M3 in order to reduce the cost of encoding the current frame using the current diversified motion model. When the objective function is met, the current diversified motion model associates, with each block of the current frame, a global motion model, such that the blocks of the current frame can be encoded (such as at 1404 of FIG. 14) using the associated motion models. The objective function is further explained below.

The motion models can be refined in any number of ways. For example, refining a motion model can mean generating another parameterized motion model, as described above, for the same blocks that use the motion model. The another parameterized motion model can, for example, use a motion model type different than that of the motion model. For example, refining a motion model can mean generating a motion model for a subset of the blocks of the current frame. For example, the subset can include all the blocks except for one, two, or any number of blocks. In another example, RANSAC over all the blocks of the current frame, weighted by the respective encoding costs of the blocks, can be used. That is, RANSAC can be biased toward those blocks of the current frame for which the current diversified motion model is not optimal. That is, RANSAC can be biased toward those blocks associated with the highest errors.

At 1708, the process fixes the motion models M2 and M3. That is, the process 1700 uses, without varying, the last determined motion models M2 and M3. As such, in the first iteration, the initial motion models assigned to the motion models M2 and M3, at 1702, are used.

At 1710, the process 1700 generates candidate motion models $M'_1$ for REF_1. In an example, four candidate motion models $M'_1$ can be generated (e.g., $M'_{1,1}$, $M'_{1,2}$, $M'_{1,3}$, $M'_{1,4}$). However, any number of candidate motion models can be generated.

For each of the candidate motion models, the process 1700 determines (not shown in FIG. 17) a respective error of encoding the current frame using M2, M3, and the motion model candidate. In an example, the respective errors can be determined similarly to 1502 of FIG. 15. For example, aggregated residuals for the combinations (M'$_{1,1}$, M2, M3), (M'$_{1,2}$, M2, M3), (M'$_{1,3}$, M2, M3), and (M'$_{1,4}$, M2, M3) are determined.

At 1712, the process 1700 sets M1 to the best candidate motion models M'$_1$ that result in the smallest aggregated residual, similarly to 1504 of FIG. 15. Assuming, for example, that M'$_{1,2}$ is selected, then the new combination M1 (set to M'$_{1,2}$), M2, M3 constitutes the current diversified motion model.

At 1714-1718, the process 1700 performs actions similar to those described with respect to 1708-1712, except that M1 and M3 are fixed at 1714, candidate motion models M'$_2$ (e.g., M'$_{2,1}$, M'$_{2,2}$, M'$_{2,3}$, M'$_{2,4}$) are generated for M2 at 1716, and M2 is set to the best candidate motion model M'$_2$. M1 is fixed to the candidate motion model M'$_1$ of 1712.

At 1720-1724, the process 1700 performs actions similar to those described with respect to 1708-1712 and 1714-1718, except that M1 and M2 are fixed at 1720, candidate motion models M'$_3$ (e.g., M'$_{3,1}$, M'$_{3,2}$, M'$_{3,3}$, M'$_{3,4}$) are generated for M3 at 1722, and M3 is set to the best candidate motion model M'$_3$. M1 is fixed to the candidate motion model M'$_1$ of 1712. M2 is fixed to the candidate motion model M'$_2$ of 1718.

To summarize the operations 1708-1712, 1714-1718, and 1720-1724, the process 1700 generates first motion model candidates (e.g., M'$_{2,1}$, M'$_{2,2}$, M'$_{2,3}$, M'$_{2,4}$) for a first reference frame (e.g., REF_2), and determines, for each of the first motion model candidates (e.g., M'$_{2,1}$, M'$_{2,2}$, M'$_{2,3}$, M'$_{2,4}$), a respective error of encoding the current frame using the respective motion models (e.g., M1, M3) of the other frames (e.g., REF_1, REF_3) and the motion model candidate. The process 1700 then sets the motion model (e.g., M2) of (i.e., associated with) the first reference frame (e.g., REF_2) to one of the first motion model candidates (e.g., M'$_{2,1}$, M'$_{2,2}$, M'$_{2,3}$, M'$_{2,4}$) corresponding to a smallest aggregated residual.

The process 1700 then proceeds back to 1706 to determine whether the objective function is met. In an example, the objective function can be a number of iterations. The number of iterations can be any number (e.g., 2, 3, 4, etc.). As such, the process 1700 ends at 1726 when the process 1700 performs 1708-1724 the number of iterations times.

In another example, the objective function can be related to an error of encoding the current frame using the motion models. The error threshold can relate to the error associated with encoding the current frame using the motion models M1, M2, and M3 set during an iteration of 1708-1724. That is, the error threshold can relate to the error associated with encoding the current frame using the current diversified motion model. The error can be a mean square error between pixel values of a block of the current and pixel values of a prediction block of a reference frame. The error can be a sum of absolute differences error. Any other suitable error measure can be used.

In an example, the objective function can be such that the error must be improved by a certain error threshold from one iteration to the next. As such, if an iteration does not improve the error by at least the error threshold, then the process 1700 proceeds from 1706 to 1726. For example, the objective function can be considered met when an iteration does not improve the encoding of a given percentage of the blocks of the current frame. Said another way, the objective function is such that, with every iteration, coding of the given percentage of the blocks of the current frame must be improved. In an example, the percentage can be a third of the blocks of the frame. In another example, 10% of the blocks must be improved. Any percent threshold can be used.

In some situations, it may not be possible to identify (i.e., determine, generate, etc.), within a reasonable number of iterations or amount of computing resources, an optimal motion model for some pixels or blocks of the current frame. As such, errors associated with these blocks or pixels are excluded from the error calculation, as these blocks do not provide a measure of the iteration-to-iteration improvements. Accordingly, a robustness measure can be added to the objective function by adding condition(s) that exclude these blocks from the error (e.g., the aggregated error) determination. Excluding some blocks from the aggregated error calculations may result in a high cost (i.e., a sub-optimal diversified motion model) of encoding such blocks. However, excluding such blocks prevents a situation where such blocks can skew or bias an otherwise optimal diversified motion model for the rest of the blocks of the current frame.

In an example, blocks of the current frame that do not meet a block-wise error threshold are excluded from the determining of the error. In an example, the block-wise error threshold can be "in the 95$^{th}$ percentile of the errors." That is, the blocks of the current frame that are associated with the 5% highest errors are excluded from the determination of the error to be used in the objective function.

In another example, block errors that exceed a threshold can be excluded from the determining of the error. For example, and assuming that the threshold is 200, then if the error (e.g., MSE) associated with predicting a block of the current frame is greater than 200, then the error is not added to the aggregated residual.

Figure 18:
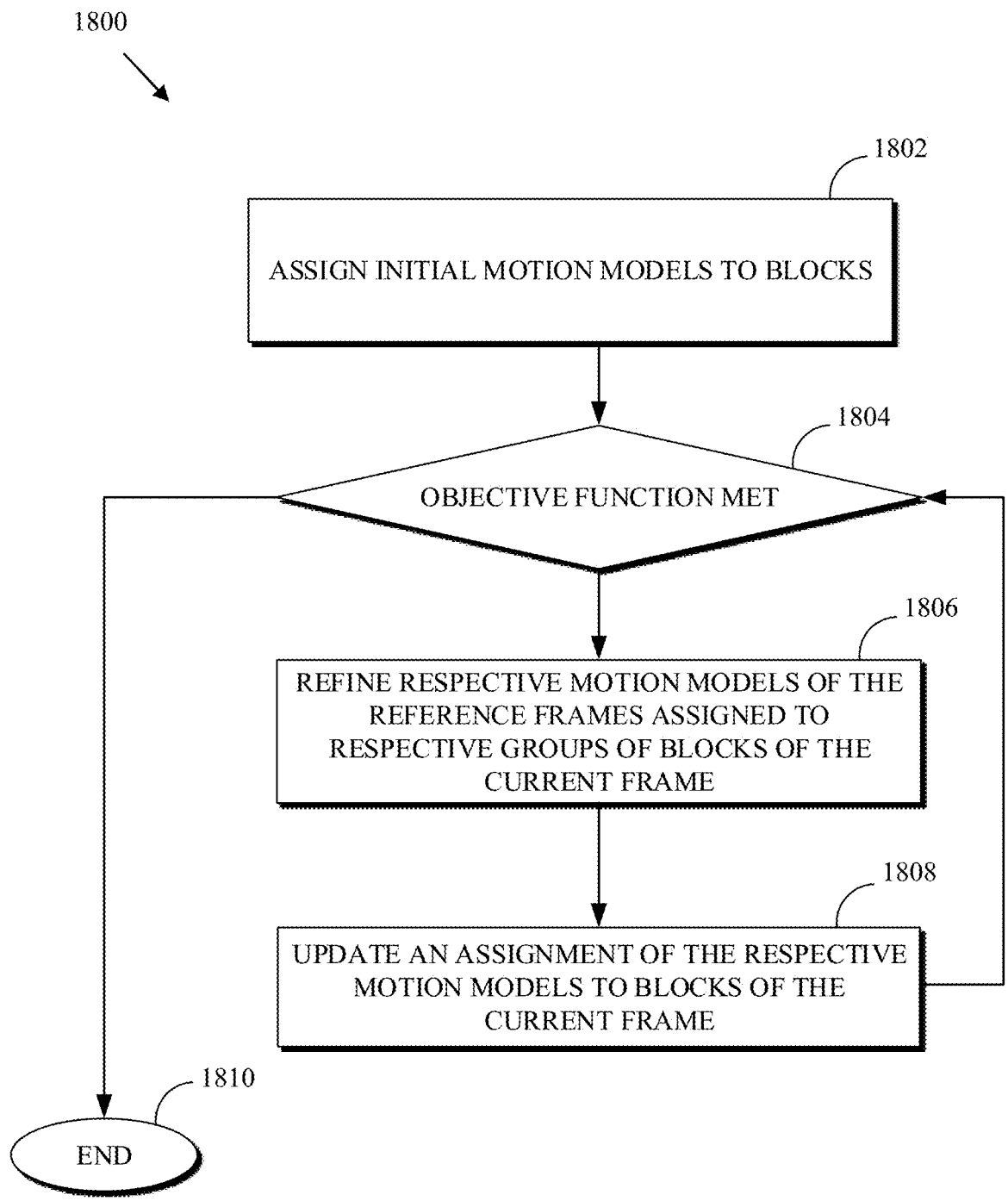
FIG. 18 is a flowchart diagram of a process for jointly determining motion models according to yet another implementation of this disclosure.

FIG. 18 is a flowchart diagram of a process 1800 for jointly determining motion models according to yet another implementation of this disclosure. The process 1800 is described with respect to three reference frames. However, any number of reference frames can be available.

The process 1800 simultaneously updates the motion models M1, M2, and M3 and the blocks of the current frame to which the motion models M1, M2, and M3 are assigned. As such, the process 1800 optimizes two dependent quantities: the motion models (which are determined based on the blocks assigned to the motion models) and the block assignments (i.e., which blocks are assigned to which motion models). As used herein, "a block of the current frame is assigned to a motion model" means that the motion model can be used to predict the block. As used herein, "a motion model is assigned to a block of the current frame" means that the motion model can be used to predict the block.

At 1802, the process 1800 makes an initial assignment of initial motion models to blocks of the current frame. In an example, the process 1800 can partition the current frame into a number of groups of blocks that is equal to the number of reference frames. Each group of blocks constitutes a subset of blocks of the current frame.

An initial motion model can be generated for each of the groups with respect to a respective reference frame. For example, given three reference frames REF_1, REF_2, and REF_3 and three groups G1, G2, and G3, the process 1800 can generate a motion model M1 for predicting the blocks of the group G1 from the reference frame REF_1, a motion model M2 for predicting the blocks of the group G2 from the reference frame REF_2, and a motion model M3 for predicting the blocks of the group G3 from the reference frame REF_3. The motion models M1, M2, and M3 constitute the respective motion models of the reference frames and constitute the current diversified motion model.

The current frame can be partitioned into groups in any number of ways. For example, each block of the current frame can be randomly assigned to a group. In another example, a consecutive (e.g., in a raster scan order) percentage of the blocks can be assigned to each group. For example, the first third of the blocks can be assigned to the group G1, the second third of the blocks can be assigned to the group G2, and the third third of the blocks can be assigned to the group G3. Other ways of partitioning the current frame are possible. The segments can include the same or a different number of blocks.

At 1804, the process 1800 determines whether an objective function is met. If so, the process 1800 ends at 1810. Otherwise, the process 1800 proceeds to 1806 to perform an iteration for improving the current motion models and the block assignments. The objective function can be as described with respect to 1706 of FIG. 17.

At 1806, the process 1800 refines the respective motion models of the reference frames assigned to respective groups of blocks of the current frame. As such, the process 1800 updates (i.e., refines) the motion models M1, M2, and M3 with the block assignments fixed. The motion models can be refined as described with respect to FIG. 17.

The motion models M1, M2, and M3 are refined using the same groups of blocks (e.g., G1, G2, and G3) assigned to each of the motion models. That is, during the refinement operation, each motion model is refined while considering only the blocks assigned to the motion model in order to reduce the overall encoding cost, using the motion model, of the blocks assigned to the motion model.

As such, refining the respective motion models of the reference frames assigned to the respective groups of blocks of the current frame can include assigning a first motion model of a first reference frame of the reference frames to a first group of blocks of the current frame, assigning a second motion model of a second reference frame of the reference frames to a second group of blocks of the current frame, and updating the first motion model and the second motion model to minimize a cost of encoding the first group of blocks and the second group of blocks.

At 1808, the process 1800 updates an assignment of the respective motion models to blocks of the current frame. That is, the block assignment of all the blocks of the current frame may be updated with all the motion models (i.e., the refined motion models M1, M2, and M3 of 1806) fixed. The refined motion models M1, M2, M3 correspond to the current diversified motion model. The process 1800 can update the block assignment by picking (i.e., associating, etc.), for each block of the current block, the one of the refined motion models M1, M2, and M3 that minimizes the block encoding cost. As such, the block 1808 can result in different blocks being included in each of the groups G1, G2, and G3. The updated groups G1, G2, and G3 are used in a next iteration at block 1806. As such, a block that is included in a group of the groups G1-G3 can be said to be associated with the motion model of the group. It is to be noted that, at 1808, the updating of the motion models to blocks may result in some of the motion models not being assigned to any blocks of the current frame. Accordingly, when the process 1800 reaches 1810, some of the motion models may not be assigned to any of the blocks of the current frame.

As such, updating the assignment of the respective motion models to blocks of the current frame can include reassigning the first motion model and the second motion model to blocks of the first group of blocks and the second group of blocks to minimize a cost of encoding the blocks of the first group of blocks and the second group of blocks.

Figure 19:
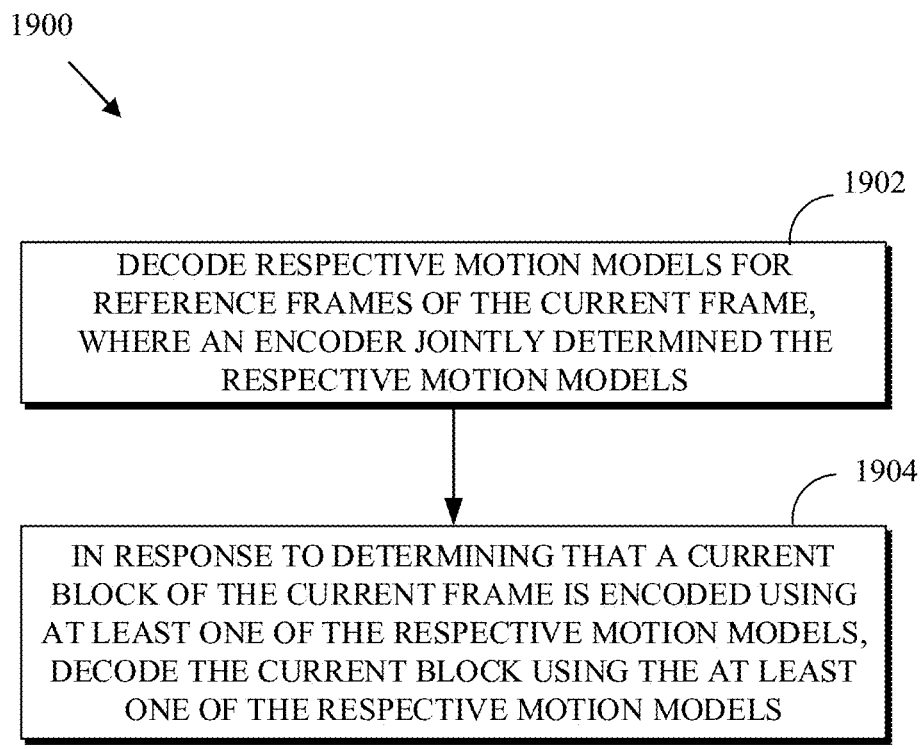
FIG. 19 is a flowchart diagram of a process for decoding a current frame according to one implementation of this disclosure.

FIG. 19 is a flowchart diagram of a process 1900 for decoding a current frame according to one implementation of this disclosure. The process 1900 receives an encoded bitstream, such as the compressed bitstream 420 of FIG. 5. The process 1900 may be performed by a decoder. For example, the process 1900 can be performed in whole or in part by the intra/inter-prediction stage 508 of the decoder 500. The process 1900 can be performed in whole or in part during the reconstruction path (shown by the dotted connection lines) of the encoder 400 of FIG. 4. Implementations of the process 1900 can be performed by storing instructions in a memory, such as the memory 204 of the receiving station 106 or the transmitting station 102, to be executed by a processor, such as the CPU 202, for example.

The process 1900 can be implemented using specialized hardware or firmware. Some computing devices can have multiple memories, multiple processors, or both. The steps or operations of the process 1900 can be distributed using different processors, memories, or both. For simplicity of explanation, the process 1900 is depicted and described as a series of steps or operations. However, the teachings in accordance with this disclosure can occur in various orders and/or concurrently. Additionally, steps or operations in accordance with this disclosure may occur with other steps or operations not presented and described herein. Furthermore, not all illustrated steps or operations may be used to implement a method in accordance with the disclosed subject matter.

At 1902, the process 1900 decodes, from an encoded bitstream, respective motion models for reference frames of the current frame. The respective motion models for the reference frames constitute a diversified motion model for predicting the current frame. The motion models of the reference frames were encoded in the bitstream by an encoder, such as the encoder 400 of FIG. 4, where the encoder jointly determined the respective motion models. The encoder may have jointly determined the respective motion models using one of the processes 1500, 1700, or 1800.

At 1904, the process 1900, in response to determining that a current block of the current frame is encoded using at least one of the respective motion models, decodes the current block using the at least one of the respective motion models.

For simplicity of explanation, the processes 600, 1000, 1400, 1500, 1700, 1800, and 1900 are depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special-purpose computer/processor, which can contain other hardware for carrying out any of the methods, algorithms, or instructions described herein, can be utilized.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for encoding a current frame of a video, comprising:
jointly determining respective global motion models (GMMs) for reference frames, the reference frames used for encoding the current frame, by:
generating, for each reference frame, a respective plurality of GMMs,
wherein the reference frames comprising a first reference frame and a second reference frame, and
wherein the respective plurality of the candidate GMMs comprising first respective candidate GMMs for the first reference frame and second respective GMMs for the second reference frame;
determining respective aggregated residuals for combinations of candidate GMMs,
wherein each combination of candidate GMMs comprising a first candidate GMM from the first respective candidate GMMs and a second candidate GMM from the second respective candidate GMMs, and
wherein determining a respective aggregated residual of the respective aggregated residuals using one combination of candidate GMMs comprising:
for each of a plurality of blocks of the current frame, selecting a smallest block residual of block residuals, wherein each block residual of the block residuals is derived using a respective GMM from the one combination of candidate GMMs; and
aggregating the respective smallest residuals corresponding to each of the plurality of blocks of the current frame; and
selecting a combination of candidate GMMs corresponding to a smallest aggregated residual of the respective aggregated residuals, wherein the respective GMMs correspond to the candidate GMMS of the selected combination of candidate GMMs; and
encoding the current frame using the respective GMMs.

2. The method of claim 1, wherein determining the respective aggregated residuals for the combinations of the candidate GMMs comprises:
generating a respective residual for some of the candidate GMMs of one of the reference frames.

3. The method of claim 2,
wherein a combination of the combinations of candidate GMMs comprises a first candidate GMM for the first reference frame, a second candidate GMM for the second reference frame, and a third candidate GMM for a third reference frame, and
wherein determining the respective aggregated residuals for the combinations of the candidate GMMs comprises:
determining, for a current block, a first residual block using the first candidate GMM;

determining, for the current block, a second residual block using the second candidate GMM;
determining, for the current block, a third residual block using the third candidate GMM; and
adding, to an aggregated residual of the current frame, the one of the first residual block, the second residual block, and the third residual block corresponding to a smallest residual block.

4. The method of claim 2, wherein generating the respective residual for some of the candidate GMMs of the reference frame comprises:
partitioning the current frame into blocks; and
predicting the blocks using one of the candidate GMMs of the reference frame.

5. The method of claim 1, wherein four candidate GMMs are used for each of the reference frames of the current frame.

6. The method of claim 1, wherein the reference frames of the current frame comprise a reference image that is a non-displayable frame of the video.

7. The method of claim 1, wherein determining the respective aggregated residuals for the combinations of the candidate GMMs comprises:
generating respective candidate GMMs for one of the reference frames independently of the candidate GMMs of other reference frames.

8. The method of claim 1, wherein the current frame comprises a first group of blocks and a second group of blocks, and wherein determining the respective aggregated residuals for the combinations of the candidate GMMs comprises:
generating a candidate GMM for the first group of blocks; and
determining an aggregated residual for the current frame using the candidate GMM for the first group of blocks and using other GMMs for the second group of blocks.

9. An apparatus for encoding a current frame of a video, the apparatus comprising:
a processor configured to execute instructions stored in a non-transitory storage medium to:
jointly determine global motion models (GMMs) for reference frames, wherein a respective GMM of the GMMs is determined for a respective reference frame of the reference frames, and wherein to jointly determine the GMMs for the reference frames comprises to:
generate, for each reference frame, a respective initial GMM, wherein the reference frames comprising a first reference frame, and wherein the respective initial GMMs comprising an initial GMM for the first reference frame;
determine a cost of encoding the current frame using the respective initial GMMs; and
iteratively refine, until an objective function is met, the GMMs to reduce the cost of encoding the current frame using the respective GMMs, wherein to iteratively refine the GMMs comprises to, in a first iteration:
generate new candidate GMMs for the first reference frame;
for each combination of GMMs, determine a respective residual of encoding the current frame using the each combination of the GMMs,
wherein a combination of GMMs comprises a new candidate GMM of the new candidate GMMs and the respective initial GMMs of all reference frames excluding the first reference frame;
determine a best combination of GMMs corresponding to a smallest residual of the respective residuals as compared to the cost of encoding the current frame using the respective initial GMMs,
wherein the best combination of GMMs comprises a best candidate GMM of the new candidate GMMs; and
update the initial GMM of the first reference frame to be best candidate GMM; and
encode the current frame using the refined GMMs.

10. The apparatus of claim 9, wherein the reference frames consist of the first reference frame and other reference frames, and wherein to iteratively refine, until the objective function is met, the GMMs to reduce the cost of encoding the current frame using the respective GMMs comprises to:
generate GMM candidates for the first reference frame;
determine, for each GMM candidate of the GMM candidates, a respective error of encoding the current frame using the respective GMMs of the other frames and the GMM candidate; and
set the GMM of the first reference frame to one of the first GMM candidates corresponding to a smallest aggregated residual.

11. The apparatus of claim 10, wherein the objective function is related to an error of encoding the current frame using the GMMs.

12. The apparatus of claim 11, wherein the error of encoding the current frame using the GMMs is a mean square error.

13. The apparatus of claim 11, wherein to determine the respective error of encoding the current frame using the respective GMMs comprises to:
exclude, from determining of the respective error, blocks of the current frame that meet a block-wise error threshold.

14. The apparatus of claim 13, wherein to determine the respective error of encoding the current frame using the respective GMMs comprises to:
exclude, from the determining of the respective error, block errors that exceed a threshold.

15. The apparatus of claim 9, wherein the objective function is a number of iterations.

16. An apparatus for encoding a current frame of a video, the apparatus comprising:
a processor configured to execute instructions stored in a non-transitory storage medium to:
jointly determine global motion models (GMMs) for reference frames, wherein to jointly determine the GMMs for the reference frames comprises to:
until an objective function is met, performing instructions to:
refine respective GMMs of the reference frames assigned to respective groups of blocks of the current frame, where to refine the respective GMMs of the references frames assigned to the respective groups of the blocks of the current frame comprises to:
assign a first GMM of a first reference frame of the reference frames to a first group of blocks of the current frame;

assign a second GMM of a second reference frame of the reference frames to a second group of blocks of the current frame; and update the first GMM and the second GMM to minimize a cost of encoding the blocks of the first group of blocks and second group of blocks; and update an assignment of the respective GMMs to blocks of the current frame; and encode the current frame using the GMMs.

17. The apparatus of claim 16, wherein to update the assignment of the respective GMMs to blocks of the current frame comprises to:

reassign the first GMM and the second GMM to blocks of the first group of blocks and the second group of blocks to minimize a cost of encoding the blocks of the first group of blocks and the second group of blocks.

* * * * *